(12) United States Patent
LeMay et al.

(10) Patent No.: US 12,373,356 B2
(45) Date of Patent: Jul. 29, 2025

(54) FAST KEY ID SWITCHING VIA EXTENDED PAGING FOR CRYPTOGRAPHIC INTRA-PROCESS ISOLATION

(71) Applicant: Intel Corporation, Santa Clara, CA (US)

(72) Inventors: Michael LeMay, Hillsboro, OR (US); David M. Durham, Beaverton, OR (US); Salmin Sultana, Hillsboro, OR (US); Andrew V. Anderson, Hillsboro, OR (US); Hans Goran Liljestrand, Helsinki (FI)

(73) Assignee: Intel Corporation, Santa Clara, CA (US)

( * ) Notice: Subject to any disclaimer, the term of this patent is extended or adjusted under 35 U.S.C. 154(b) by 392 days.

(21) Appl. No.: 18/147,510

(22) Filed: Dec. 28, 2022

(65) Prior Publication Data
US 2024/0220423 A1 Jul. 4, 2024

(51) Int. Cl.
*G06F 12/14* (2006.01)
*H04L 9/08* (2006.01)

(52) U.S. Cl.
CPC ........ *G06F 12/1408* (2013.01); *H04L 9/0819* (2013.01)

(58) Field of Classification Search
CPC ......... H04L 9/08; H04L 9/0819; G06F 12/14; G06F 12/1408
See application file for complete search history.

(56) References Cited

U.S. PATENT DOCUMENTS

| | | | |
|---|---|---|---|
| 8,024,730 B2* | 9/2011 | Campbell | G06F 21/6281 718/100 |
| 9,213,653 B2 | 12/2015 | Durham et al. | |
| 9,804,870 B2 | 10/2017 | Neiger et al. | |
| 10,146,570 B2 | 12/2018 | Wang et al. | |
| 10,404,674 B1* | 9/2019 | Bshara | H04L 9/0894 |
| 10,776,525 B2* | 9/2020 | Gueron | G06F 12/1425 |
| 2019/0087575 A1* | 3/2019 | Sahita | G06F 21/71 |
| 2019/0095350 A1* | 3/2019 | Durham | G06F 12/145 |
| 2020/0201786 A1* | 6/2020 | Ouziel | G06F 12/0246 |
| 2020/0310972 A1* | 10/2020 | Shanbhogue | G06F 21/79 |
| 2020/0372188 A1* | 11/2020 | Basak | G06F 21/79 |

(Continued)

FOREIGN PATENT DOCUMENTS

| | | |
|---|---|---|
| EP | 3614284 A1 | 2/2020 |
| EP | 3688649 A1 | 8/2020 |

OTHER PUBLICATIONS

Advanced Micro Devices, AMD Memory Encryption, Apr. 21, 2016, 1-12.

(Continued)

*Primary Examiner* — Shanto Abedin
(74) *Attorney, Agent, or Firm* — Nicholson De Vos Webster & Elliott LLP

(57) ABSTRACT

Techniques disclosed include selecting a first key identifier (ID) for a first compartment of a compartmentalized process of a computing system, the first compartment including first private data; assigning a first extended page table (EPT) having at least one memory address including the first key ID; encrypting the first private data with a first key associated with the first key ID; and storing the encrypted first private data in a memory starting at the at least one memory address of the first EPT.

25 Claims, 25 Drawing Sheets

(56) References Cited

U.S. PATENT DOCUMENTS

2021/0064254 A1    3/2021   Durham et al.
2021/0109870 A1*   4/2021   Sahita ................. G06F 12/1491
2023/0030961 A1    2/2023   Banginwar et al.

OTHER PUBLICATIONS

Advanced Micro Devices, AMD SEV-SNP: Strengthening VM Isolation with the Integrity Protection and More, Jan. 1, 2020, 1-20.
Advanced Micro Devices, SEV Secure Nested Paging Firmware ABI Specification, Jan. 1, 2022, Publication # 56860, 1-124, Revision: 1.51.

* cited by examiner

FAST KEY ID SWITCHING VIA EXTENDED PAGING FOR CRYPTOGRAPHIC INTRA-PROCESS ISOLATION

BACKGROUND

Memory encryption technologies (such as Multi-key Total Memory Encryption (MKTME)) and virtualization technologies provide highly efficient intra-process thread separation. To enable the best performance within Function as a Service (FaaS), browser and microservice workloads, software threads of an application share the same process space. This creates a potential security problem because different parts of the application can access all the memory of the process.

BRIEF DESCRIPTION OF DRAWINGS

Various examples in accordance with the present disclosure will be described with reference to the drawings.

The figures are not to scale. In general, the same reference numbers will be used throughout the drawing(s) and accompanying written description to refer to the same or like parts.

DETAILED DESCRIPTION

Figure 1:
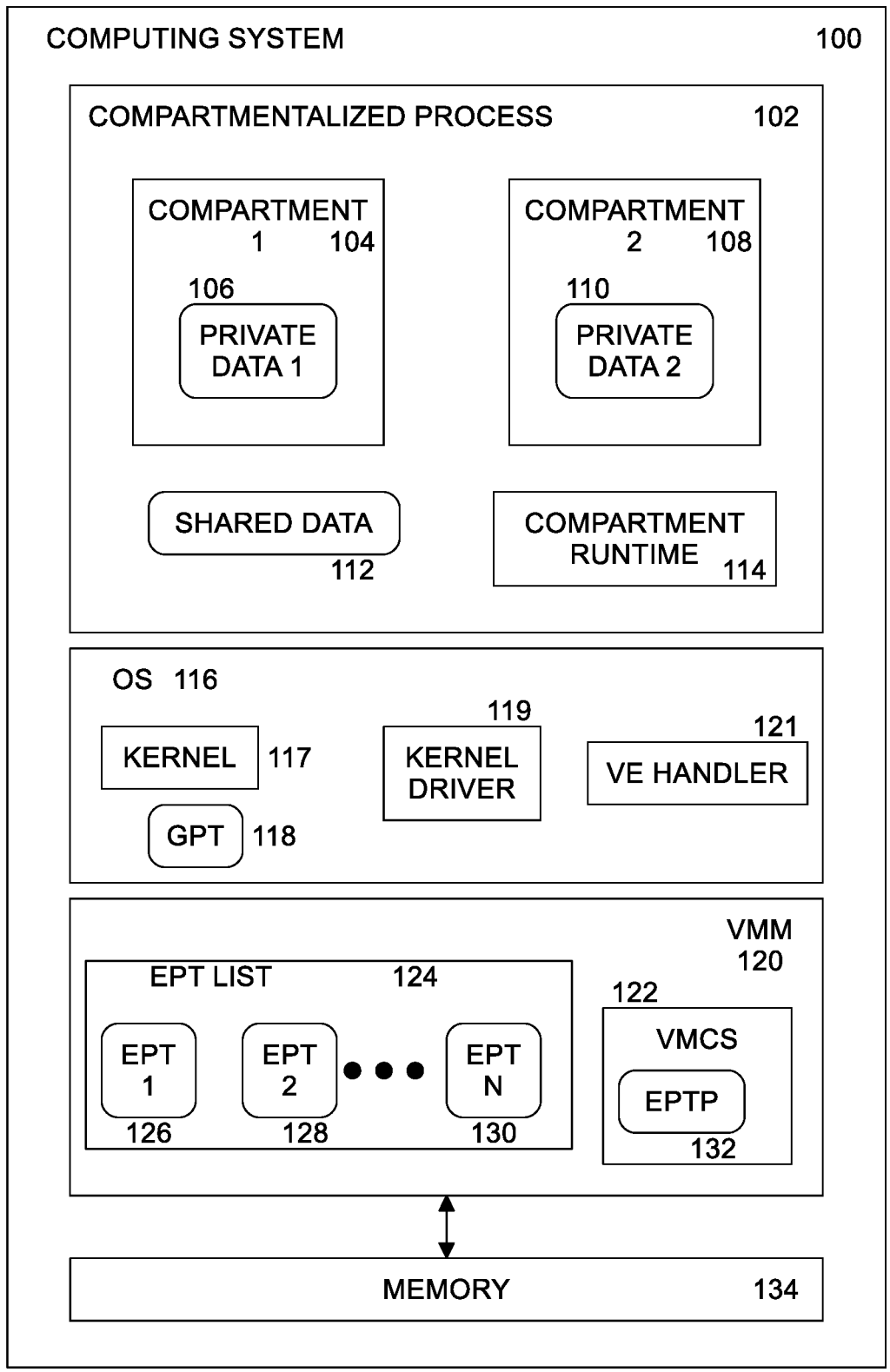
FIG. 1 illustrates a computing system providing cryptographically isolated intra-process threads according to an implementation.

The present disclosure relates to methods, apparatus, systems, and non-transitory computer-readable storage media that utilizes memory encryption (such as Total Memory Encryption Multi-Key (TME-MK)(MKTME)) to provide cryptographic separation between threads with near ideal performance and memory utilization as cryptographically isolated threads can utilize the same physical pages, relying on cryptographic operations to separate their individual data allocations even when allocated within the same shared memory page.

The technology described herein uses features of virtualization technology (such as Virtualization Technology (VT) from Intel Corporation) with multikey memory encryption technologies (such as TME-MK/MKTME from Intel Corporation) in a new way, "inverting" VT such that instead of cryptographically isolating virtual machines (VMs) or separate processes, the technology described herein cryptographically isolates individual threads and their data objects within a shared process. This allows threads to share the same process memory space, while still having their private heap data allocations and stacks protected from other threads sharing the same process. Private thread data remains private while threads can selectively choose what data to cryptographically protect or share at a sub-page granularity.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real-world imperfections.

As used herein, "processor circuitry" or "hardware resources" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

As used herein, a computing system can be, for example, a server, a disaggregated server, a personal computer, a workstation, a self-learning machine (e.g., a neural network), a mobile device (e.g., a cell phone, a smart phone, a tablet (such as an iPad™)), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

FIG. 1 illustrates a computing system 100 providing cryptographically isolated intra-process threads according to an implementation. A process is a collection of virtual memory space, code, data, and system resources. A thread is code that is to be serially executed within a process. A processor executes threads, not processes, so each application has at least one process, and a process always has at least one thread of execution, known as the primary thread. A process can have multiple threads in addition to the primary thread. Thus, a process is the program code under action whereas a thread is the smallest segment of instructions that can be handled independently by a scheduler. As used herein, a compartmentalized process is a process that include a compartment runtime and one or more compartments. In the example shown in FIG. 1, compartmentalized process 102 includes multiple compartments.

As used herein, a compartment comprises a unit of code to be cryptographically isolated from other compartments. A compartment is a fine-grained unit; that is, multiple compartments may exist within in a single process. In the example shown in FIG. 1, compartmentalized process 102 includes two compartments, compartment 1 104 having private data 1 104 and compartment 2 108 having private data 2 110. Private data 1 106 of compartment 1 104 should not be accessible by compartment 2 108 and private data 2 110 of compartment 2 108 should not be accessible by compartment 1 104. Compartment 1 104 and compartment 2 108 may share access to shared data 112.

In an implementation, compartment runtime 114, executing as part of compartmentalized process 102 in user space, manages cryptographic isolation of private data 1 106 and private data 2 110 while allowing shared access to shared data 112. Compartment runtime 114 comprises code to initialize, schedule, terminate, and arrange communications between, and otherwise manage compartments. Compartment runtime 114 switches between compartments as needed. Compartment runtime 114 may load the code of the compartments for execution by a processor. In an implementation, compartment runtime 114 may be a part of a runtime library.

Computing system 100 includes operating system (OS) 116. OS 116 includes guest page table (GPT) 118, kernel 117, kernel driver 119, and virtualization exception (VE) handler 121. Computing system 100 also include virtual machine manager (VMM) 120 (also known as a hypervisor). VMM 120 includes virtual machine control structure (VMCS) 122. In an implementation, VMM 120 includes a list 124 of extended page tables (EPTs), including EPT 1 126, EPT 2, . . . EPT N 130, where N is a natural number. Any one of the EPTs in EPT list 124 may be referenced by EPT pointer 132 in VMCS 122. Private data 1 106, private data 2 110, and shared data 112 are physically stored in pages in memory 134. Alternative embodiments may use other features that provide a second level of address translation such as Nested Page Tables (NPTs) or Stage 2 Translation Tables.

In an implementation, each compartment (e.g., compartment 1 104 and compartment 2 108) needs access to a different private key identifier (ID) identifying a particular memory encryption key. The technology described herein enforces the use of different key IDs by different compartments using EPTs that can specify in their entries what key ID should be used for a particular memory mapping. Because EPTs operate as a second level of address translation, this permits the use of different EPTs specifying different private key IDs with a single guest-level page table that is shared by multiple compartments. Large EPT pages may be used when the EPT only needs to distinguish the key ID used by a hardware thread for any arbitrary memory mapping. In an implementation, only the EPTs are specific to compartments. This is in contrast to the typical usage of EPTs for isolating multiple VMs from each other, with each VM containing multiple processes, each with its own guest page table. Thus, the technology described herein inserts cryptographic isolation boundaries in the topmost layer of the software system stack rather than the bottommost layer (as in prior approaches). Data is encrypted and decrypted while it is in the memory hierarchy, e.g., between the Last-Level Cache (LLC) and the Dynamic RAM (DRAM), between two levels of cache, or between the processor and the first-level cache. The key ID is maintained to provide separation for data while in the cache, preventing access to cachelines when the key ID associated with a particular cacheline does not match the key ID used in the address of a particular processor load or store operation.

Figure 2:
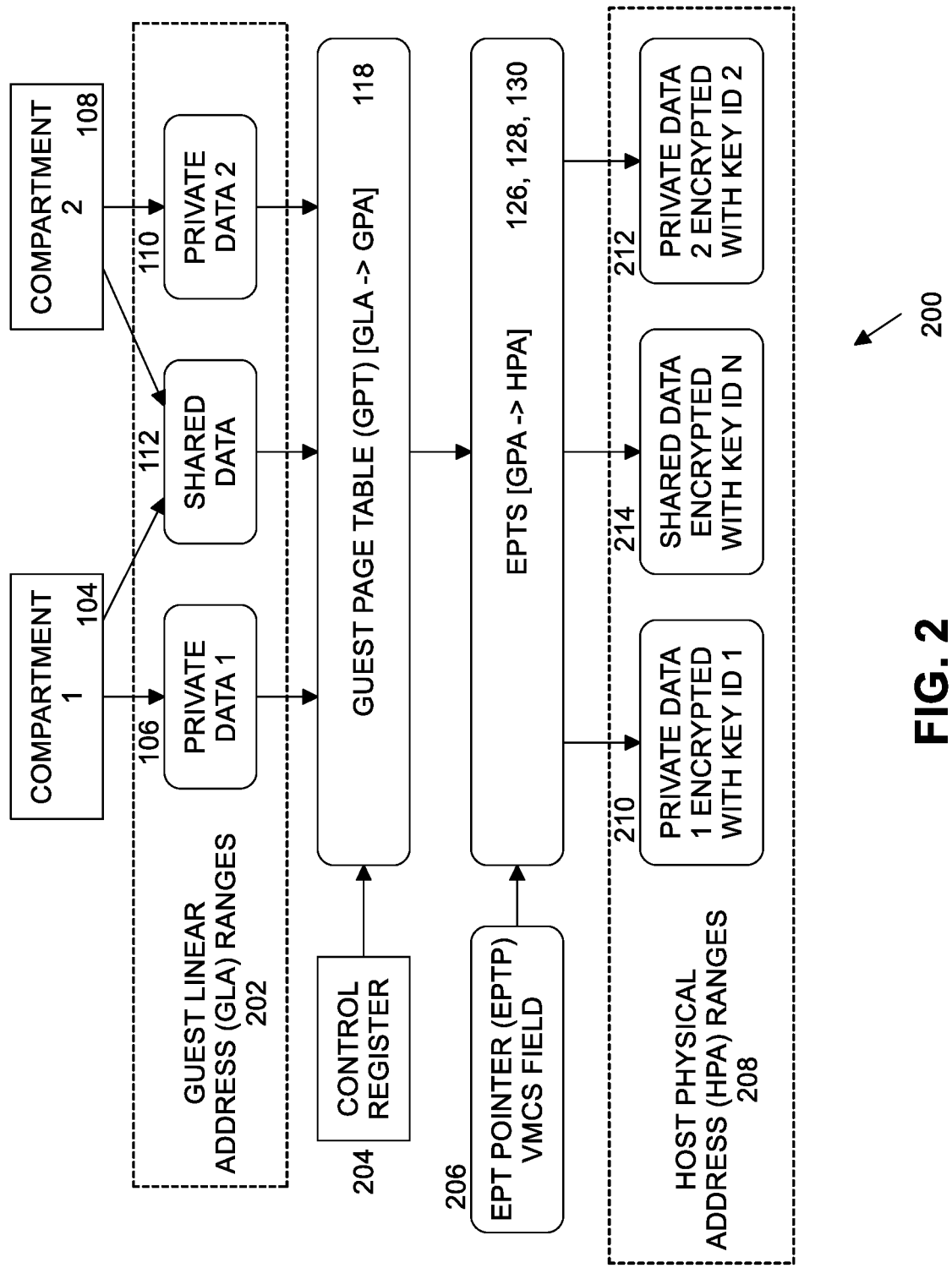
FIG. 2 illustrates how a second level of address translation may be switched for changing key identifiers (IDs) used for memory accesses in an implementation.

FIG. 2 illustrates how a second level of address translation 200 may be switched for changing key identifiers (IDs) used for memory accesses in an implementation. Private data 1 106, private data 2 110 and shared data 112 are referenced by addresses in guest linear address (GLA) ranges 202. It should be noted that the same GLA ranges may be accessible by both compartment 1 104 and compartment 2 108, but the EPT provided key IDs are different. Thus, the same memory location is accessible to both compartments, but the data at that location will not decrypt properly when the wrong key is used (e.g., compartment 1 104 accessing compartment 2 108 data).

When compartment 1 104 references (e.g., reads or writes) private data 1 106, a guest linear address of private data 1 106 is translated to a guest physical address (GPA) in guest page table (GPT) 118. GPT 118 is pointed to by control register 204. The GPA of private data 1 106 is translated to a host physical address (HPA) in host physical address (HPA) ranges 208 by an extended page table (EPT). In an implementation, there are a plurality of EPTs, such as EPT 1 126, EPT 2 129, . . . EPT N 130. For example, a GPA of private data 1 106 may be translated using EPT 1 126. The EPTs are pointed to by an EPT pointer (EPTP) field 206 in VMCS 122. After translation of the memory address from GPA to HPA, private data 1 106 is encrypted with a key ID specific to the private data of compartment 1 104, such as key ID 1. The result is private data 1 encrypted with key ID 1 210.

Similarly, when compartment 2 108 references (e.g., reads or writes) private data 2 110, a GLA of private data 2 110 is translated to a GPA in GPT 118. The GPA of private data 2 110 is translated to a HPA in HPA ranges 208 by a different EPT than was used to translate the GPA of private data 1 106. For example, a GPA of private data 2 110 may be translated using EPT 2 128. After translation of the memory address from GPA to HPA, private data 2 110 is encrypted with a key ID specific to the private data of compartment 2 108, such as key ID 2. The result is private data 2 encrypted with key ID 2 212.

Shared data 112 may be accessed by both compartment 1 104 and compartment 2 108. Thus, when either compartment 1 104 or compartment 2 108 references shared data 112, a GLA of the shared data is translated to a GPA in GPT 118. The GPA of the shared data is translated to a HPA in HPA ranges 208 by a different EPT than was used to translate both the GPA of private data 1 106 and the GPA of private data 2 110. For example, a GPA of shared data 112 may be translated using EPT N 130. After translation of the memory address from GPA to HPA, shared data 112 is encrypted with a key ID specific to the shared data, such as Key ID N.

When compartment 1 104 tries to access private data 2 110, compartment 1 106 is not authorized for such access and does not have key ID 2 (which was used to encrypt private data 2 110). Any data that is returned from the attempted access cannot be decrypted by compartment 1 104 and is useless. Similarly, when compartment 2 108 tries to access private data 1 106, compartment 2 110 is not authorized for such access and does not have key ID 1 (which was used to encrypt private data 1 106). Any data that is returned from the attempted access cannot be decrypted by compartment 2 106 and is useless.

In an implementation, EPTs include mappings for assigning key IDs to individual compartments within the same process. The EPT tables may have large page entries. That is, each entire key ID space can be mapped using just a few large page entries in the EPTs. Some embodiments may have a page size that encompasses the entire physical address space such that only one page table entry is needed to specify the key ID for the entire address space. This saves a lot of memory as the multiple new EPT structures are much smaller and quicker to create than a previous single page table structure containing many small page mappings. The VMCS 122 may be configured per core, per hardware thread. This VMCS specifies the extended page table pointer (EPTP) for referencing a particular EPT. Each hardware thread may have its own EPT structure with its own key ID mapping, even if each hardware thread is running in the same process using the same control register (e.g., CR3 in an implementation) 204 specified GPT mapping. The only difference between each hardware thread's EPT entries is the key ID (otherwise the guest to physical memory mappings may be identical copies). Every thread has access to the same memory as every other thread, only the key IDs are different (and thus the memory encryption used for that memory). Key ID aliasing may be done by the per hardware thread EPTs. Since VMCS 122 is controlled by VMM 120 privileged software or its delegate, sandboxed software (e.g., a software thread or compartment) running on a hardware thread cannot change the EPT key ID mappings given to the hardware thread by the VMM, thus preventing one hardware thread, and thus the compartment executing thereon, from accessing another hardware thread's private key IDs.

Multiple guest physical ranges may be mapped into each EPT space. For example, one mapping to the compartment's private key ID range, and another mapping to a shared key ID range. Thus, a hardware thread may use a linear to guest physical mapping to select between the compartment's private and shared key IDs. For the software running in the compartment, this means using a first linear address range for the physical shared key ID mapping and a second, different linear range for the physical private key ID mapping. The EPT sub-hierarchies for the shared mappings can themselves be shared across multiple EPTs. Since all the memory is shared between compartments, individual cachelines within a page of memory 134 may be encrypted using different key IDs as specified by each compartment's unique EPT. Thus, cacheline granular access is also provided. When freeing an allocation for a compartment, the allocation should be flushed to memory (e.g., using a CLFLUSH/CLFLUSHOPT operation in one implementation) before reassigning the heap (memory) allocation to a different compartment or shared key ID.

Figure 3:
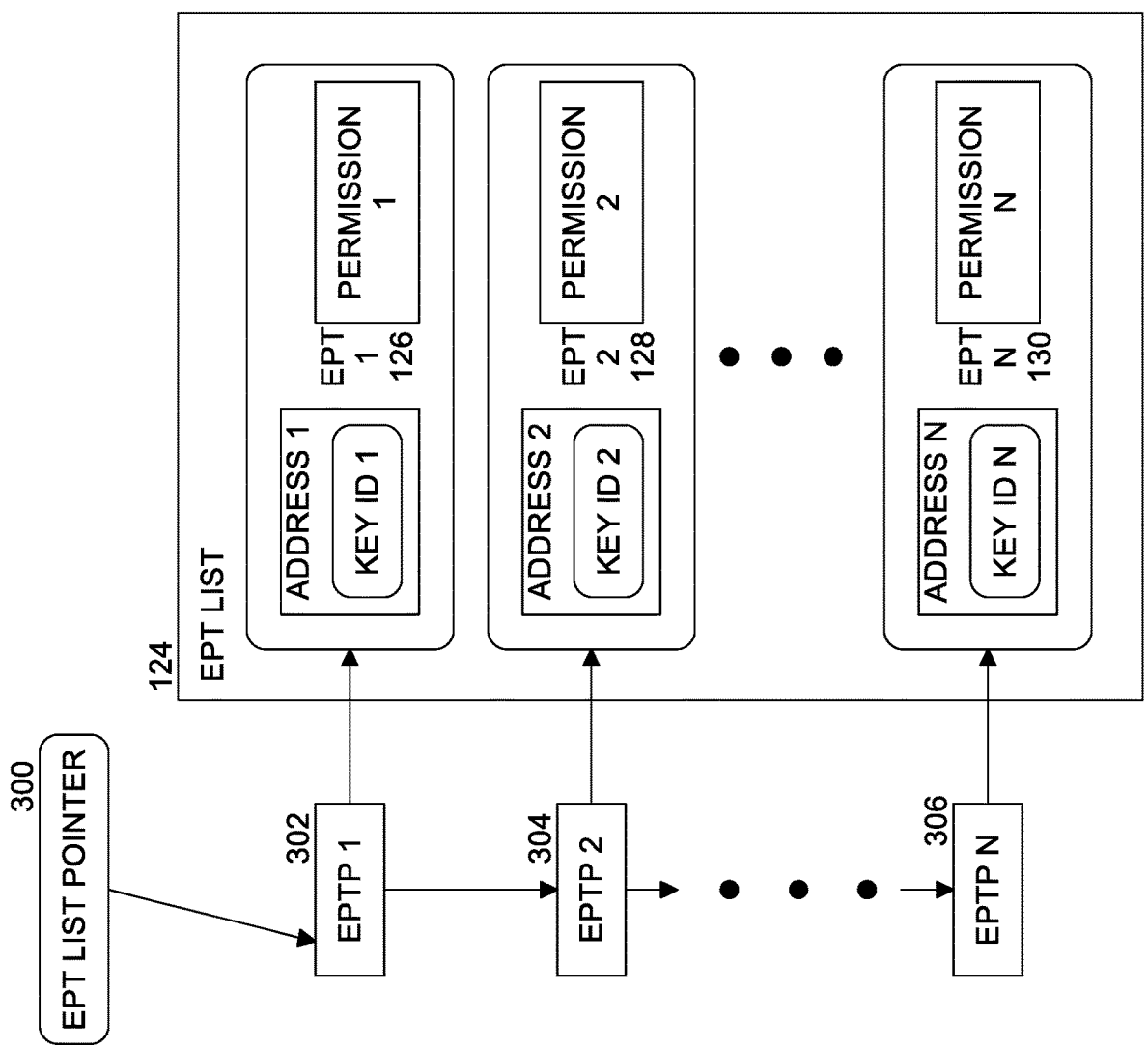
FIG. 3 illustrates a list of extended page tables (EPTs) according to an implementation.

FIG. 3 illustrates a list 124 of extended page tables (EPTs) according to an implementation. The EPT list includes a plurality of EPTs. For example, EPT list 124 may include EPT 1 126, EPT 2 128, . . . EPT N 130, where N is a natural number. EPTs may be created and deleted. Each EPT in EPT list 124 is referenced by an EPT pointer. Thus, EPT 1 126 may be referenced by EPTP 1 302, EPT 2 128 may be referenced by EPTP 2 304, . . . EPT N 130 may be referenced by EPTP N 306. EPT list pointer 300 may be used to access the list of EPTPs. Each EPT includes at least one address of memory. In an implementation, included in the address is a key ID. For example, address 1 of EPT 1 126 includes key ID 1, address 2 of EPT 2 128 includes key ID 2, . . . address N of EPT N 130 includes key ID N. Each EPT also includes a set of permission bits used to manage accesses to memory mapped by the EPT. For example, EPT 1 126 includes permission 1, EPT 2 128 includes permission 2, . . . EPT N 130 includes permission N. Each EPT may also specify other attributes. Some embodiments may, instead of an EPT list, specify a key ID list, or a list of valid key ID mappings that would be used for a single shared EPT as specified in the VMCS.

Thus, in an implementation, each EPT mapping has a different key ID, and permissions and address mappings may be the same values for each EPT. In other words, changing permissions or memory mappings is an expected usage for switching EPTs via an EPTP list. However, using the EPTP list to switch key IDs is a novel advance over prior approaches.

Figure 4A:
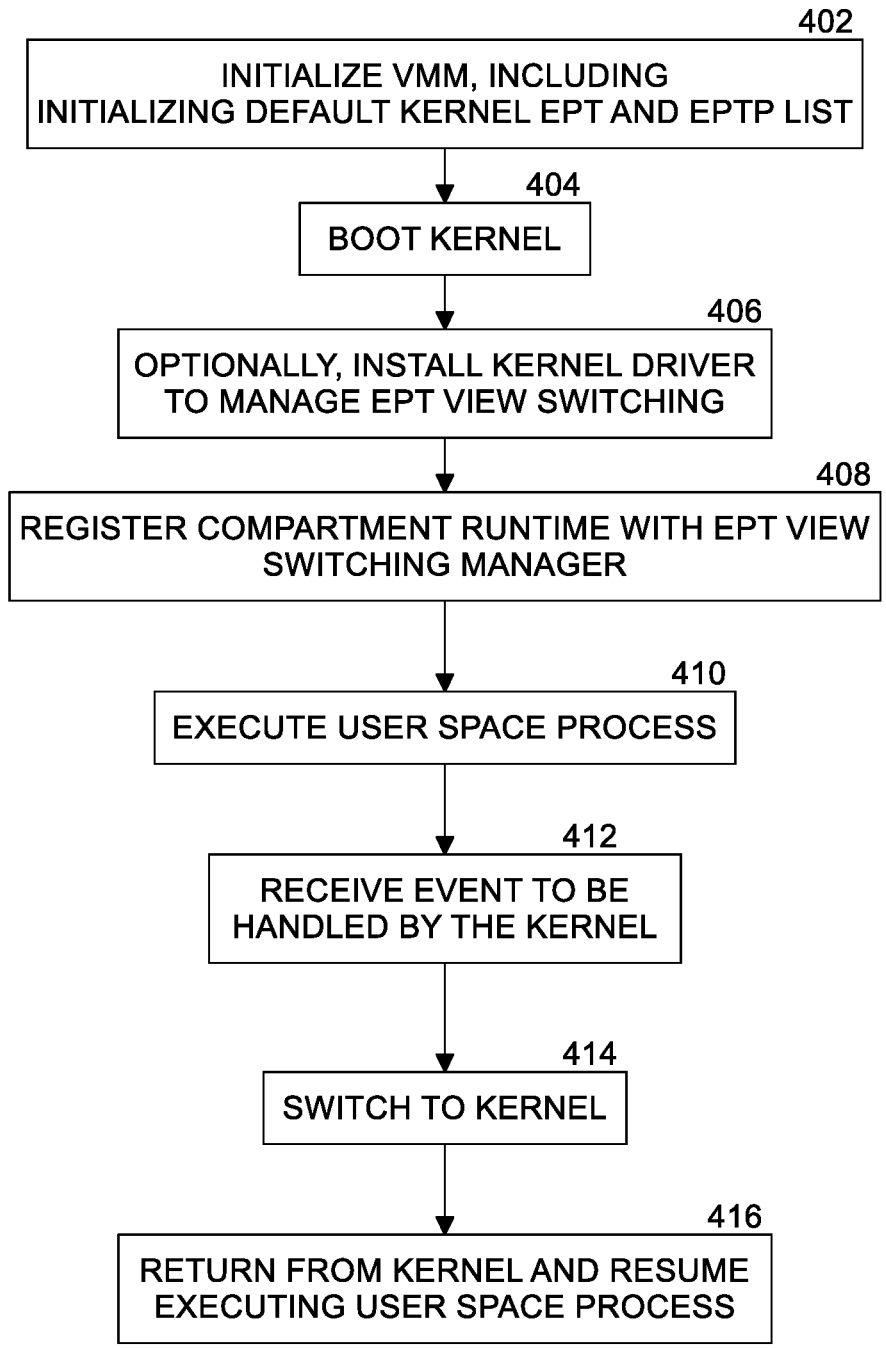
FIG. 4A illustrates switching between a user space process and an operating system (OS) kernel according to an implementation.

FIG. 4A illustrates switching 400 between a user space process (e.g., compartmentalized process 102 including compartment 1 104 or compartment 2 108) and an operating system (OS) 116 (e.g., kernel 117) according to an implementation. During initialization of computing system 100, VMM 120 is initialized at block 402. Initializing the VMM includes initializing a default kernel EPT and EPT list 124. At block 404, kernel 117 is booted. At block 406, optionally, kernel driver 119 may be installed to manage EPT view switching. The kernel driver receives events related to view management, such as a notification that memory access was attempted to a location that is inaccessible in the current view and responds appropriately, such as by switching to a view in which that location is accessible. If the kernel driver is installed, the kernel driver 119 takes over from the VMM as EPT view switching manager. If the kernel driver is not installed, then the VMM functions as the EPT view switching manager. At block 408, the compartment runtime 114 is registered with the EPT view switching manager (e.g., either kernel driver 119 or VMM 120, depending on the implementation). In an implementation, the compartment runtime requests to register itself. At block 410, computing system 100 executes a user space process, such as compartmentalized process 102. The user space process may be executed as uncompartmentalized (e.g., the user space process includes no compartments), in a compartment (e.g., compartment 1 104 or compartment 2 108) (also known as compartmentalized), or in compartment runtime 114. Regardless of which type of code is being executed by a processor computing system 100, an event may be received to be handled by the kernel at block 412. The processor is the first entity to receive the event. Events don't necessarily result in switching processes. Sometimes the same process will be resumed after the event has been processed. In other cases, processing the event results in a process switch event.

A process switch event may include a system call (syscall), an interrupt, or an exception. Control of execution is switched to kernel 117 at block 414 to handle the process switch event. This process switch event handling is described in FIG. 4B. After the kernel handles the process switch event, the kernel returns control and the processor resumes executing the user space process at block 416.

Figure 4B:
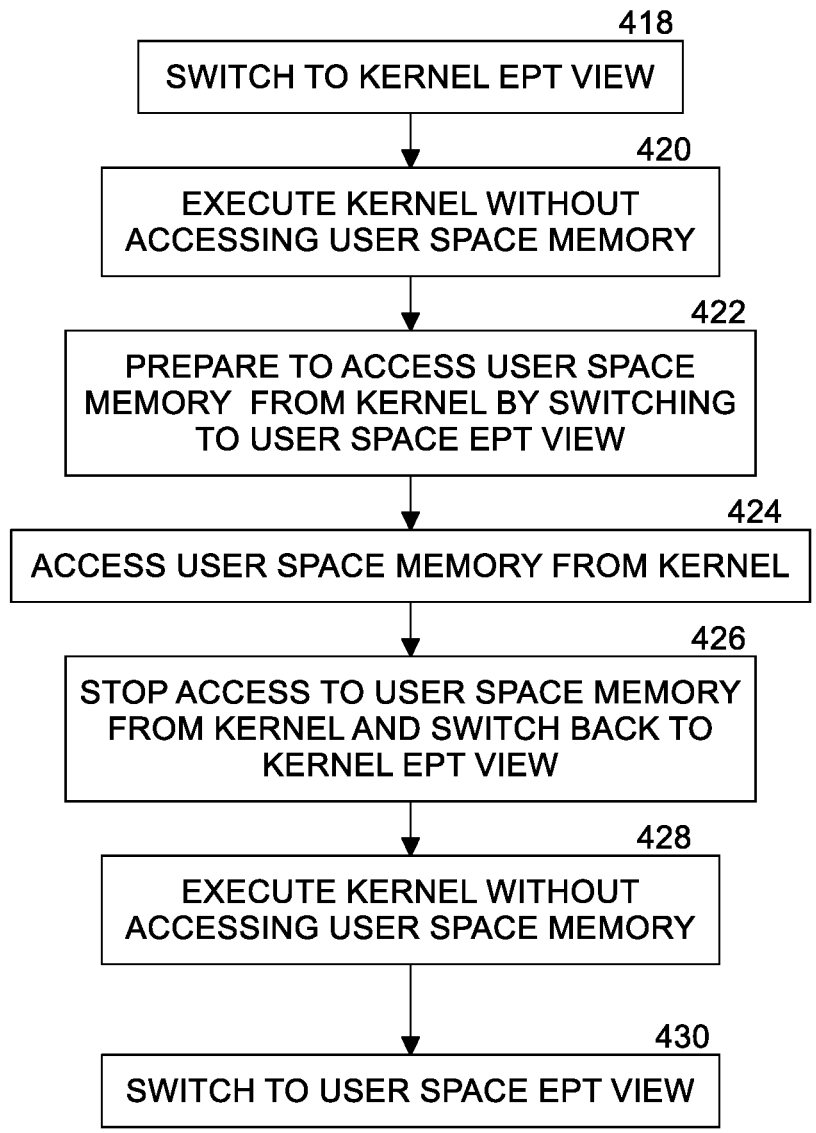
FIG. 4B illustrates kernel processing according to an implementation.

FIG. 4B illustrates kernel 117 processing according to an implementation. For example, the kernel may need to execute a system call routine requested by a user space process, handle an I/O event from a device, handle a timer interrupt, or handle an exception generated by a user space process. At block 418, execution switches to a kernel EPT view. That is, any address translation is performed using the default kernel EPT. At block 420, the kernel is executed without accessing user space memory (e.g., memory referenced by performing address translation using a compartment's EPT). At block 422, the processor prepares to access user space memory from the kernel by switching to the user space EPT view (e.g., to use the compartment's EPT). If an EPT violation occurs following that switch due to the page containing the code for accessing the user space memory is not executable in the current view, the VMM 120 may update the permissions for that code page to make the code page executable in the current view. As an optimization, the VMM may also update the permissions for that same code in the EPT views for all other compartments to make the code executable in all those views. In alternative embodiments, kernel driver 119 may issue a request to mark this code as executable when the driver is loaded to avoid an EPT violation later. At block 424, the kernel accesses user space memory (e.g., to copy data to or from a buffer in user space that was passed as a system call parameter). At block 426, access to user space memory (e.g., using the compartment's EPT) is stopped and the EPT view is switched back to the (default) kernel EPT view. At block 428, the kernel is executed without accessing user space memory. When the kernel is done handling the process switch event, at block 430 the kernel switches to the user space EPT view of the compartment that is about to be entered, or the default user space EPT view if not entering a compartment, and returns.

Figure 4C:
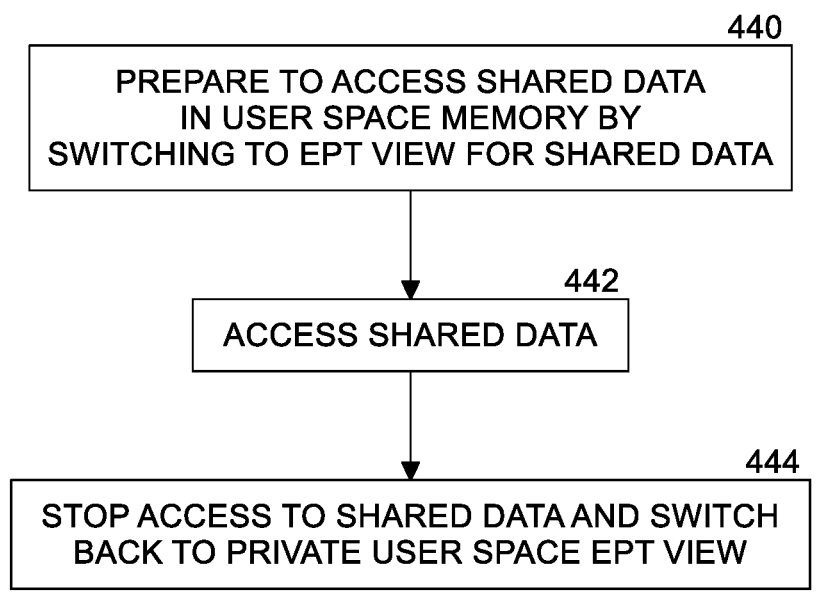
FIG. 4C illustrates accessing shared data according to an implementation.

FIG. 4C illustrates accessing shared data according to an implementation. When two or more compartments share data, these actions are performed when one of the compartments is to access the shared data. At block 440, the compartment prepares to access the shared data in user space memory by switching to an EPT view for shared data (e.g., EPT N 130 in the example shown in FIG. 2). At block 442, one of the compartments accesses the shared data using the shared EPT view. Afterwards, access to the shared data is stopped and the EPT view is switched back to the private user space EPT view for the compartment.

Figure 5:
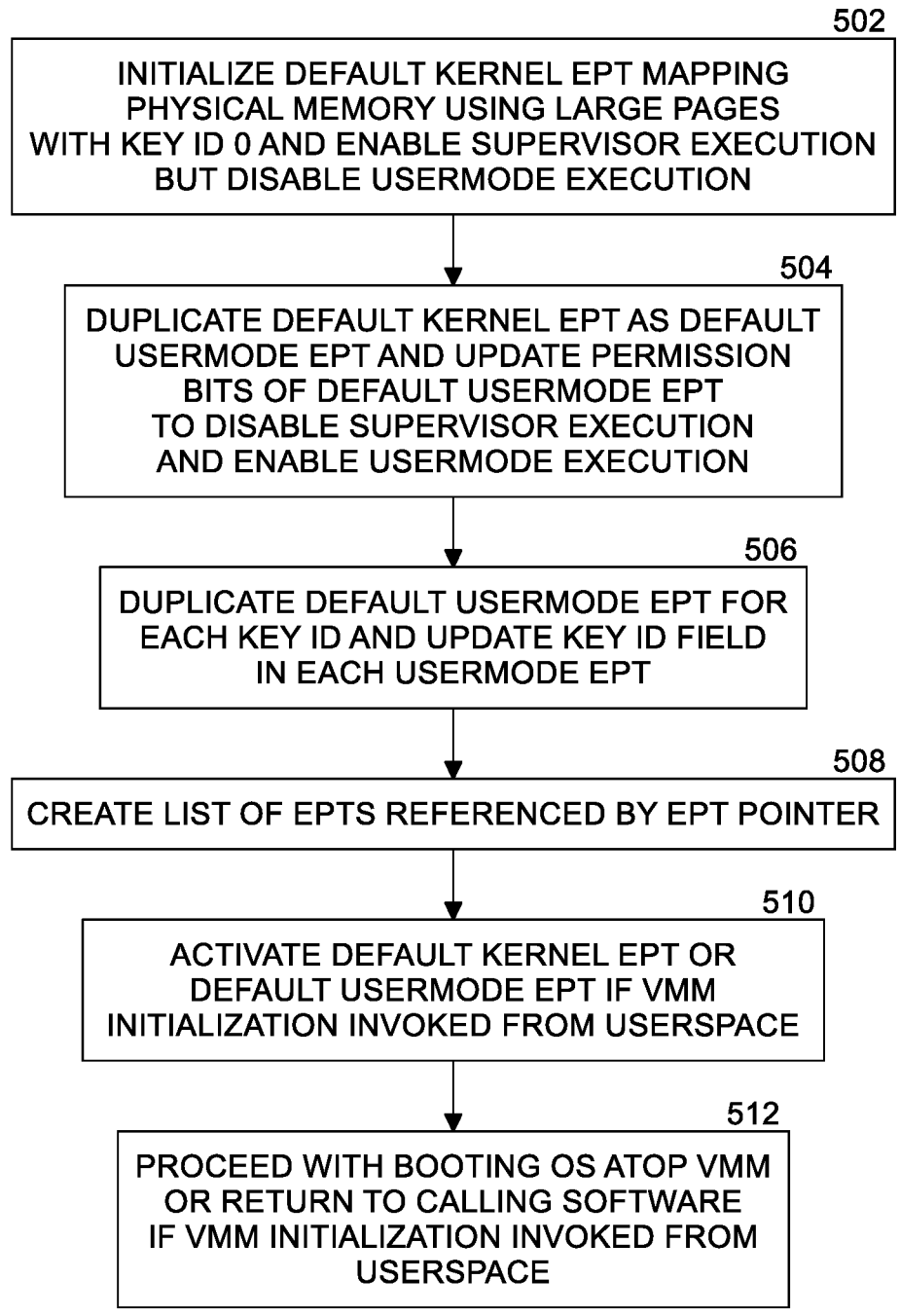
FIG. 5 illustrates initializing a virtual machine manager (VMM) according to an implementation.

FIG. 5 illustrates initializing 500 a virtual machine manager (VMM) 120 according to an implementation. Initializing the VMM includes initializing the various EPT views used by compartments for accessing private data and shared data in memory 134. In an implementation, initializing the VMM may be deferred until compartment runtime 114 is registered. At block 502, the VMM 120 initializes a default kernel EPT mapping physical memory 134, which may use large or huge pages (e.g., mapping 2 megabytes or 1 gigabytes of data from each EPT entry), with key ID 0 and enables supervisor execution but disables usermode execution. At block 504, the VMM 120 duplicates the default kernel EPT as a default usermode EPT and updates permission bits of the default usermode EPT to disable supervisor execution and enable usermode execution. Kernel execution may be permitted in pages containing VMFUNC instructions to switch to the kernel EPT view when entering the kernel, e.g., to handle a system call, interrupt, or exception. In an implementation having a virtualization exception (VE) handler 121, kernel execution may be allowed for pages containing a VE handler. At block 506, the VMM duplicates the default usermode EPT for each key ID supported by the computing system and updates the key ID field in the physical addresses in each usermode EPT, except for VE handler pages. Each EPT specifies a key ID uniformly across all leaf EPTs, except that EPT entries for code pages may all use a uniform key ID across all EPTs. The distinction between code and data pages may be indicated to the VMM by the compartment runtime issuing a VMCALL specifying a range of guest linear addresses that contain data to be encrypted with a non-default key ID. The VMM may initially use a default key ID throughout all EPTs and then update the EPTs to use non-default key IDs just for data ranges. These permissions updates may lead the VMM to fragment large or huge pages that need to contain a mixture of code and data encrypted using non-default key IDs. At block 508, the VMM creates a list of EPTs 124 referenced by an EPT pointer (EPTP) 300. The list of EPTs includes an entry for each duplicate usermode EPT as well as the default kernel EPT and usermode EPTs. At block 510, the VMM activates the default kernel EPT, or the default usermode EPT if VMM initialization was invoked from software running in user space. At block 512, the computing system proceeds with booting OS 116 atop VMM 120 or returns to the calling software if VMM initialization was invoked from software running in user space.

Figure 6:
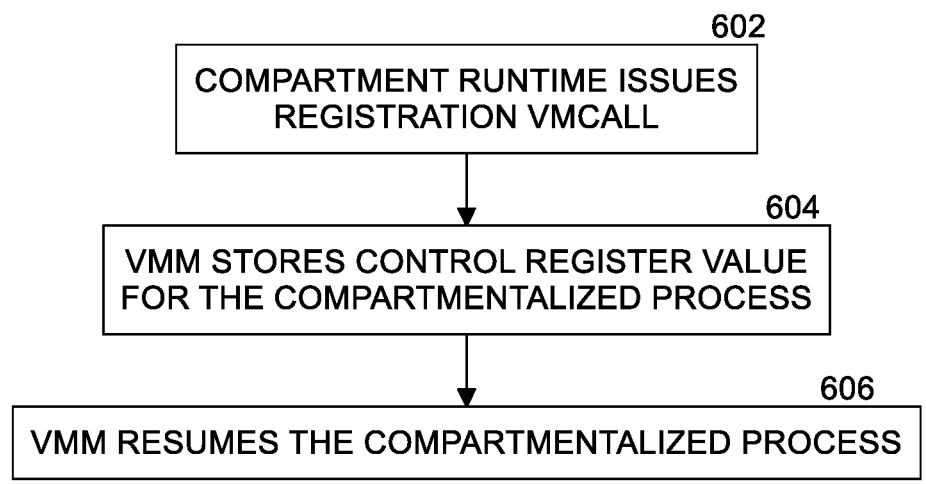
FIG. 6 illustrates a compartment runtime registering with the VMM according to an implementation.

FIG. 6 illustrates compartment runtime 114 registering with the VMM 120 according to an implementation. At block 602, compartment runtime 114 issues a registration VMCALL to VMM 120. Some embodiments may use an alternative to a VMCALL instruction such as a CPUID instruction with VM exiting enabled for CPUID instructions. At block 604, VMM 120 stores a control register 204 value for compartmentalized process 102. At block 606, the VMM issues a VMENTER to resume compartmentalized process 102.

Figure 7:
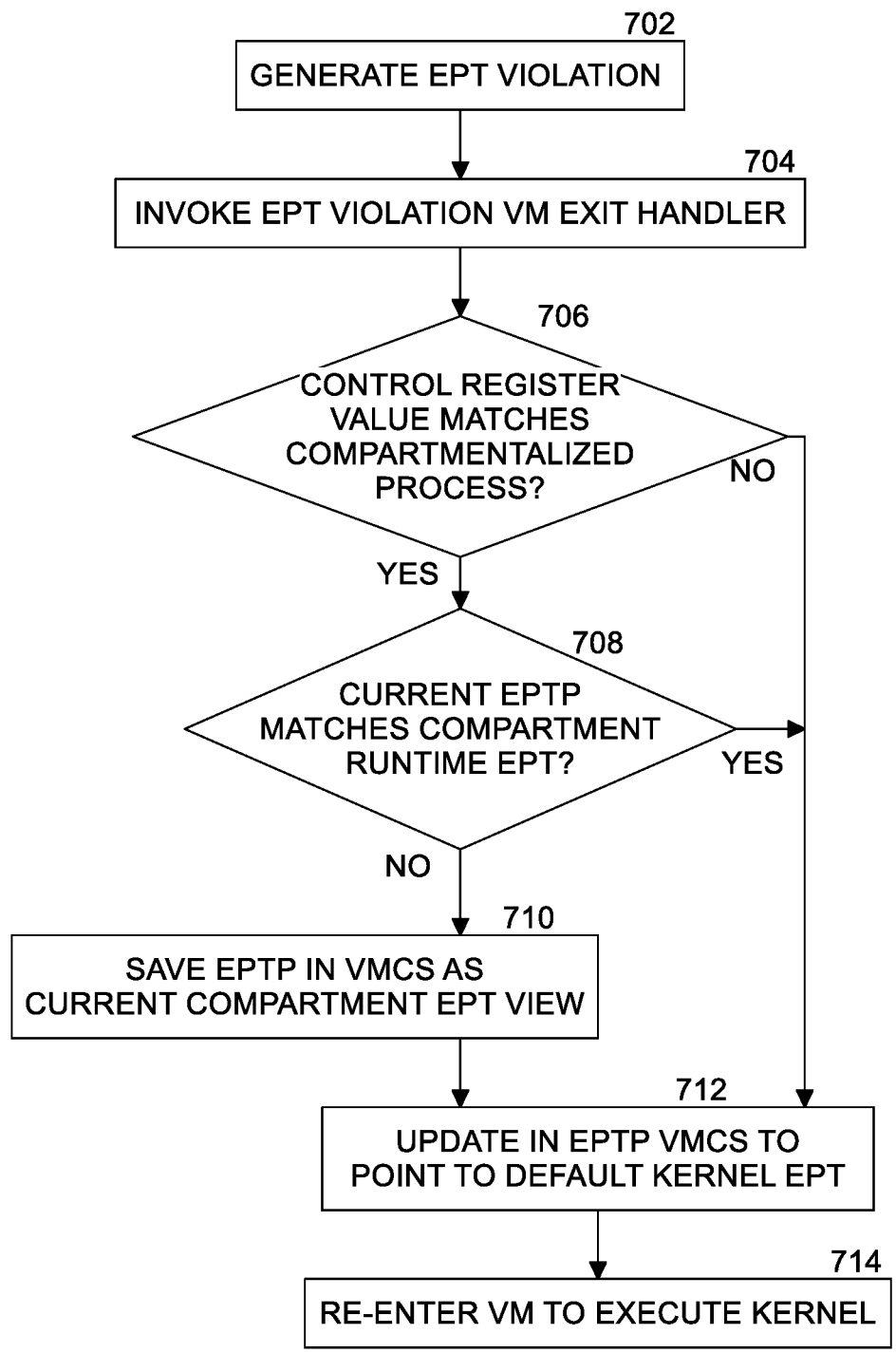
FIG. 7 illustrates transferring control from a compartment to the kernel according to an implementation.

FIG. 7 illustrates transferring control 700 from a compartment to the kernel 117 according to an implementation. When usermode execution exits to the OS 116 (e.g., due to issuing a syscall, generating an exception, or being interrupted), VMM 120 detects this event and switches to the appropriate EPT view for supervisor execution. At block 702, an EPT violation is generated due to supervisor execution being disabled in the EPT. At block 704, an EPT violation VM exit handler may be invoked. At block 706, if a current control register 204 value matches the control register value of the compartmentalized process 102, processing continues at block 708. At block 708, if the current EPTP 132 does not match the EPTP for the compartment runtime 114, then at block 710 the EPTP 132 in VMCS 122 is saved as the current compartment EPT view. The storage for the current compartment EPT view may be indexed by information that identifies the current software thread, such as the base address of thread-local storage that is specified in the guest FS or GS segment registers. That same indexing mechanism may be used when looking up the saved current compartment EPT view later. Processing continues with block 712. If the current control register values do not match the control register value of the compartmentalized process or the current EPT matches the EPTP for the compartment runtime 114, then processing proceeds to block 712. At block 712, the EPTP 132 is updated in VMCS 122 to point to the default kernel EPT. At block 714, the (guest) virtual machine (VM) VM is re-entered to execute the kernel 117.

Figure 8:
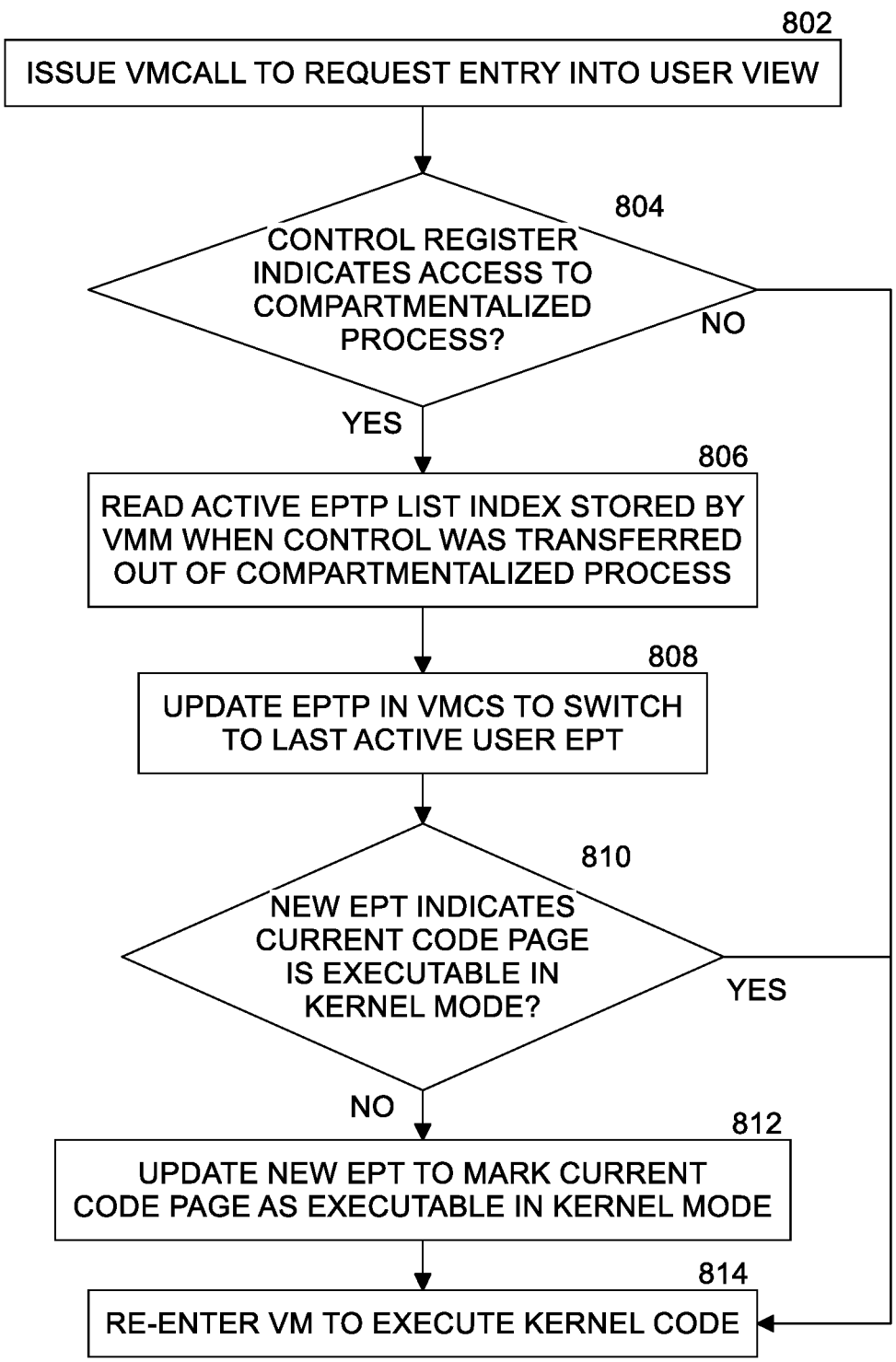
FIG. 8 illustrates the kernel accessing data in user space according to an implementation.

If a compartment was active when OS 116 was invoked, then the EPT view for that compartment is saved so that the compartment's EPT view can be restored later. The OS may need to access encrypted user space data, so the OS needs to switch to the appropriate EPT view. FIG. 8 illustrates the kernel 117 accessing data in user space processing 800 according to an implementation. At block 802, kernel 117 issues a VMCALL to request entry into a user EPT view. At block 804, if control register 204 does not indicate access to compartmentalized process 102, then the VM is re-entered to execute kernel code at block 814. At block 804, if control register 204 does indicate access to compartmentalized process 102, then at block 806 the kernel reads the active EPTP list index stored by the VMM when control was transferred out of the compartment. At block 808, the kernel updates the EPTP field 132 in VMCS 122 to switch to the last active user EPT. At block 810, if the new EPT indicates that the current code page is executable in kernel mode, then processing continues at block 814. If the new EPT indicates that the current code page is not executable in kernel mode, then at block 812 the new EPT is updated to mark the current code page as executable in kernel mode. One or more TLB mappings may be invalidated to cause the updated EPT entry value to take effect by being consulted by the processor when deciding whether to permit code execution. At block 814, the VM is re-entered to execute kernel code.

Figure 9:
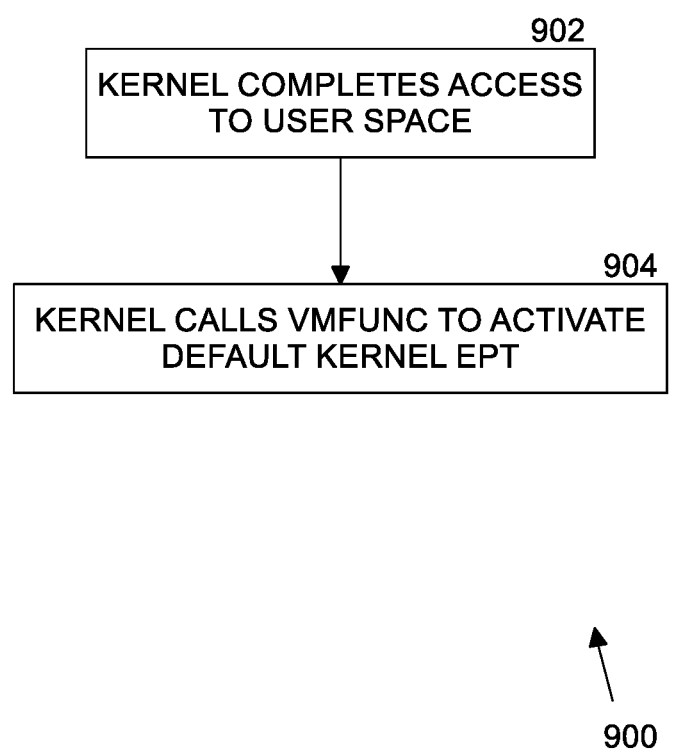
FIG. 9 illustrates switching back from accessing data in user space by the kernel according to an implementation.

When the OS 116 completes accessing user space data, the OS switches back to the default kernel EPT. FIG. 9 illustrates switching back from accessing data in user space processing 900 by the kernel 117 according to an implementation. At block 902, kernel 117 completes access to user space. At block 904, kernel 117 calls VMFUNC to activate the default kernel EPT.

Figure 10:
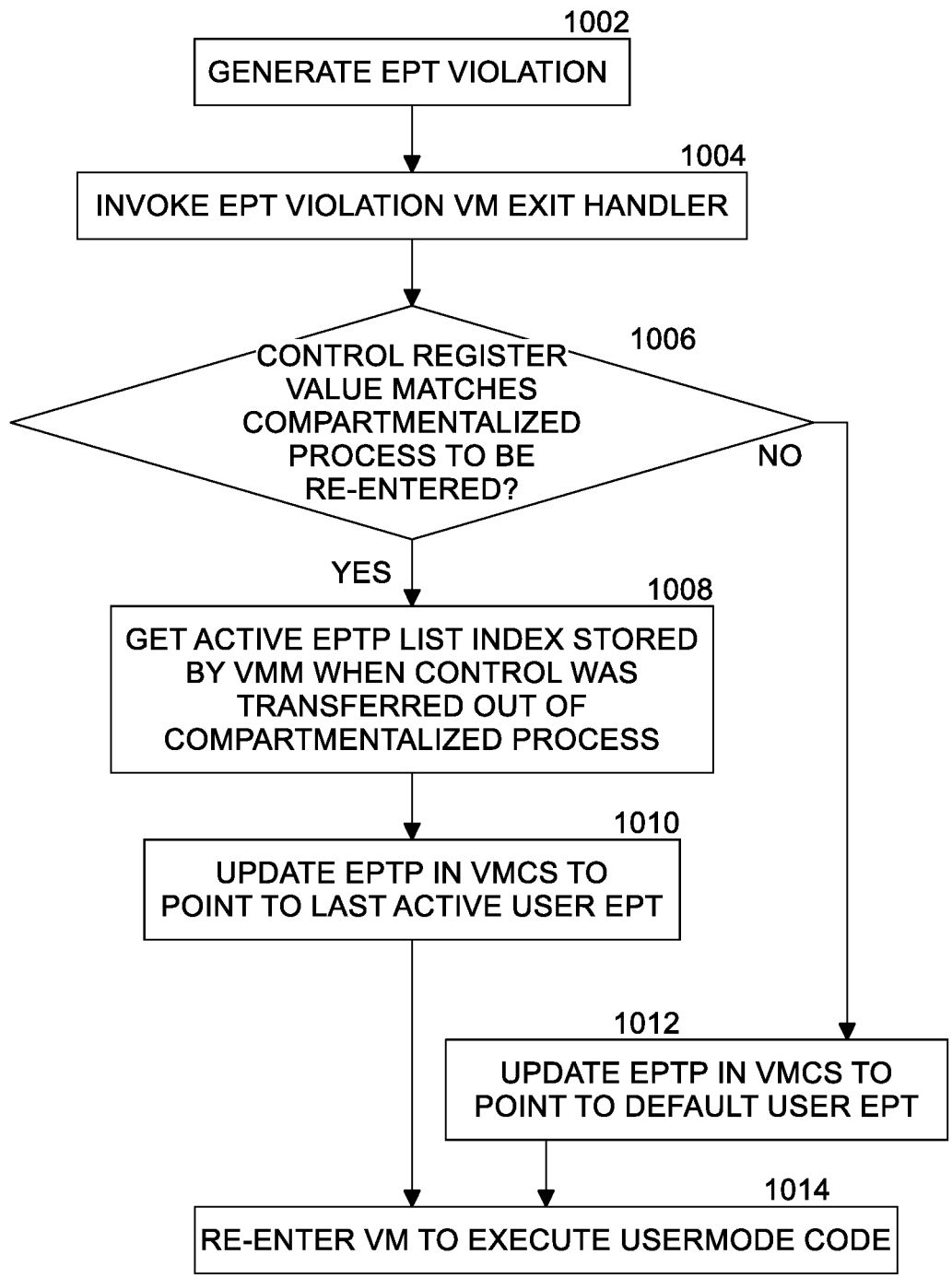
FIG. 10 illustrates VMM processing after returning from accessing data in user space according to an implementation.

When the OS 116 completes processing and determines to resume user space execution, this event is detected by VMM 120, which switches to the appropriate EPT view. FIG. 10 illustrates VMM processing 1000 after returning from accessing data in user space according to an implementation. When the kernel returns from a syscall, exception, or interrupt, at block 1002 an EPT violation is generated due to the user execution being disabled in the EPT. At block 1004, an EPT violation VM exit handler is invoked. At block 1006, if the current control register value matches the compartmentalized process 102 to be re-entered, then at block 1008 the VMM gets the active EPTP list index stored by the VMM when control was transferred out of the compartmentalized process. At block 1010, the VMM updates EPTP 132 in VMCS 122 to point to the last active user EPT. At block 1014, the VMM re-enters the VM to execute usermode code. At block 1006, if the current control register value does not match the compartmentalized process to be re-entered, then at block 1012 the VMM updates EPTP 132 in VMCS 122 to point to the default user EPT, and processing continues with block 1014.

An alternative to relying on EPT violation VM exit handlers is to install a kernel driver 119 or equivalently to modify the kernel 117 to provide a virtualization exception (VE) handler 121 that handles EPT violation events inside of the OS 116 without necessitating VM exits to VMM 120 for that purpose. In an implementation, this method may be faster than the earlier described method using the VMM. The following figures illustrate diagrams how VE handler 121 can be used. Note that the EPT initialization that was illustrated in FIG. 5 is still needed even when VE handler 121 is used. Alternative embodiments may use other features, such as a VMM Communication Exception feature, to handle EPT violation events inside of the OS 116 without necessitating VM exits to VMM 120 for that purpose.

Figure 11:
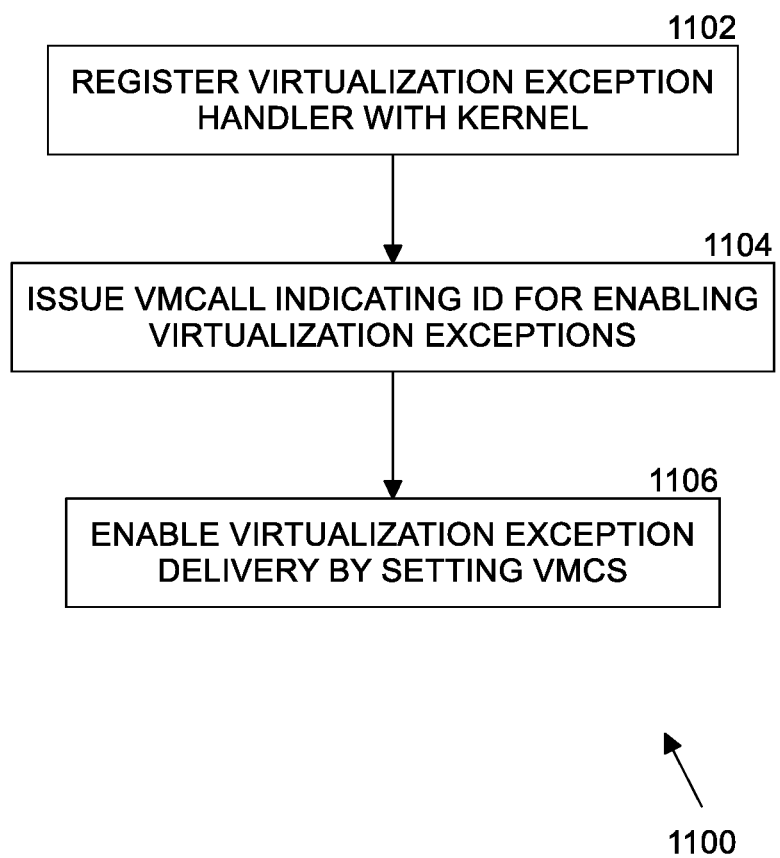
FIG. 11 illustrates initializing a virtualization exception (VE) handler according to an implementation.

FIG. 11 illustrates initializing a virtualization exception (VE) handler processing 1100 according to an implementation. At block 1102, kernel driver 119 initializes VE handler 121 and registers the VE handler with kernel 117. At block 1104, kernel driver 119 issues a VMCALL indicating an ID for enabling virtualization exceptions. At block 1106, the VMM enables virtualization exception delivery by setting appropriate fields (depending on implementations in particular processor architectures (for example, a virtualization control (#VC) exception)) in VMCS 122.

Figure 12:
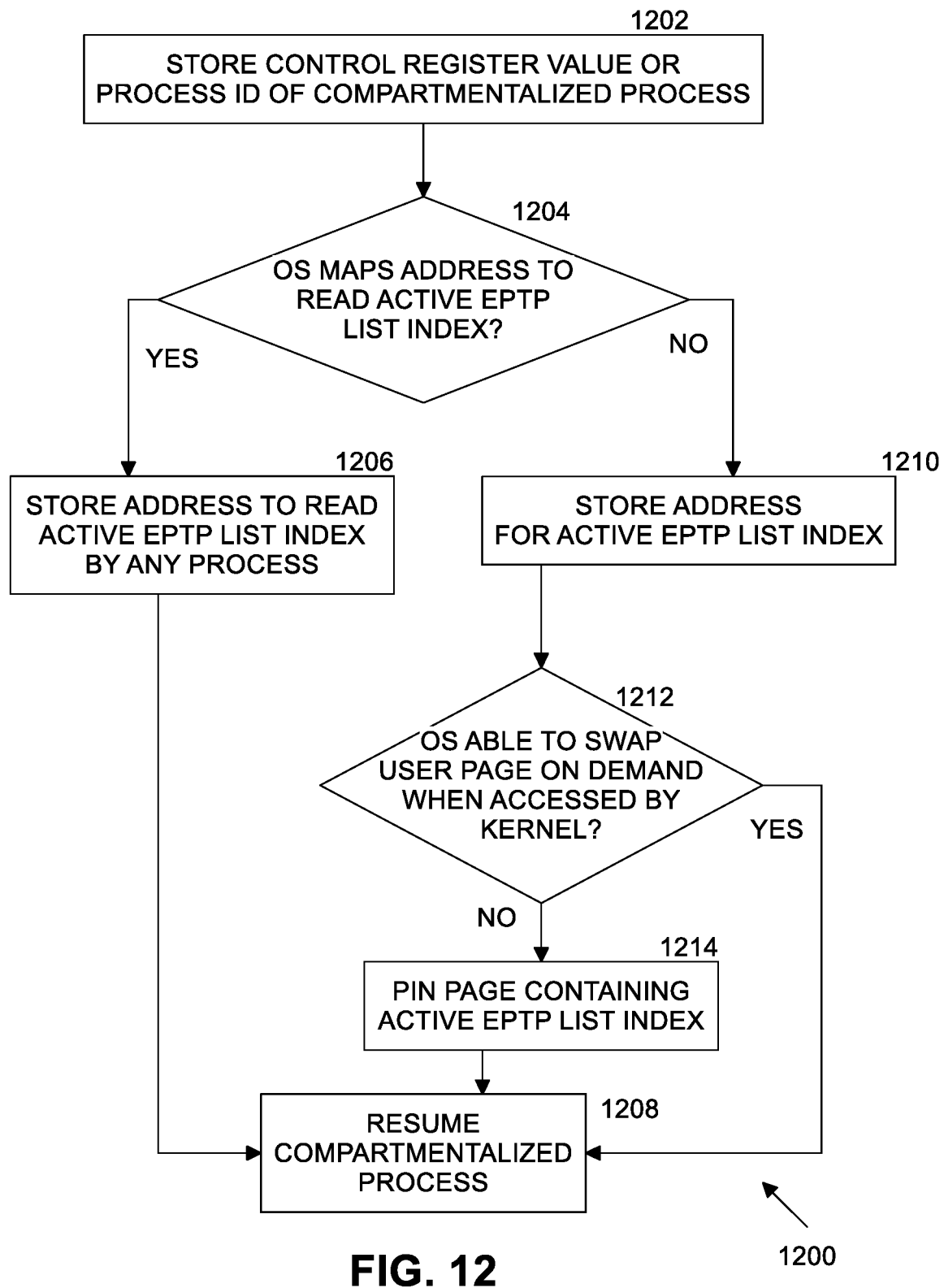
FIG. 12 illustrates VE handler processing according to an implementation.

FIG. 12 illustrates the kernel driver preparing to invoke VE handler 121 in the future for processing 1200 according to an implementation. When a compartment issues a system call, specifying a system call ID that will invoke a runtime registration routine in the kernel driver and passing a parameter with the linear address of a variable that specifies the currently active the EPTP list index, this registration routine in the driver is invoked. At block 1202, the kernel driver stores a control register value or process ID of compartmentalized process 102. At block 1204, if OS 116 maps an address that can be used by any process context to read the value of the active EPTP list index (e.g., in a direct physical map), then at block 1206, the kernel driver stores the address that can be used from any process context to read the active EPT list index. Processing then continues with block 1208, where the compartmentalized process is to resume. Otherwise, at block 1210 the kernel driver stores an address for the active EPT list index that may be valid within a single process context. At block 1212, if OS 116 is not able to swap a user page on demand when the user page is accessed by kernel 117, then at block 1214, the kernel driver pins the page containing the active EPT list index. The compartmentalized process is resumed at block 1208. If the OS 116 is able to swap a user page on demand when the user page is accessed by kernel 117, the compartmentalized process is resumed at block 1208.

Figure 13:
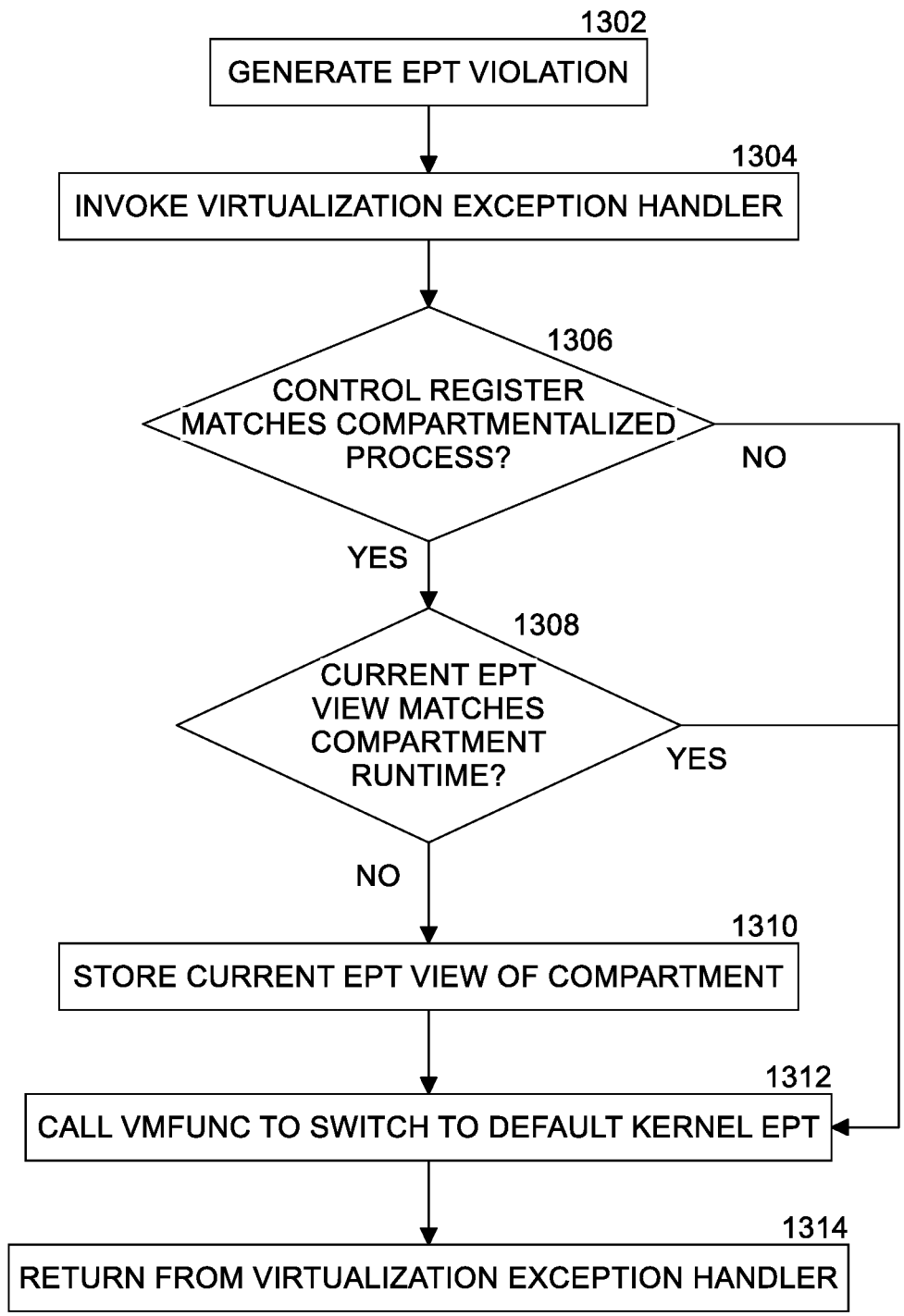
FIG. 13 illustrates EPT violation processing from user mode execution according to an implementation.

FIG. 13 illustrates EPT violation processing 1300 from user mode execution according to an implementation. When usermode execution issues a system call, generates an exception or is interrupted, at block 1302 an EPT violation is generated due to supervisor execution being disabled in the EPT. At block 1304, the processor invokes VE handler 121. At block 1306, if the current control register value matches the control register value for the compartmentalized process 102, then at block 1308 if the current EPT view as recorded in the active EPT list index does not match the EPT view of the compartment runtime 114, at block 1310, the current EPT view of the compartment is stored. Processing continues with block 1312. If the current control register value does not match the control register value for the compartmentalized process 102 or if the current EPT view as recorded in the active EPT list index does match the EPT view of the compartment runtime 114, then at block 1312 the VE handler calls VMFUNC to switch to the default kernel EPT. At block 1314, control returns from the VE handler 121 to execute the appropriate kernel routine.

Figure 14:
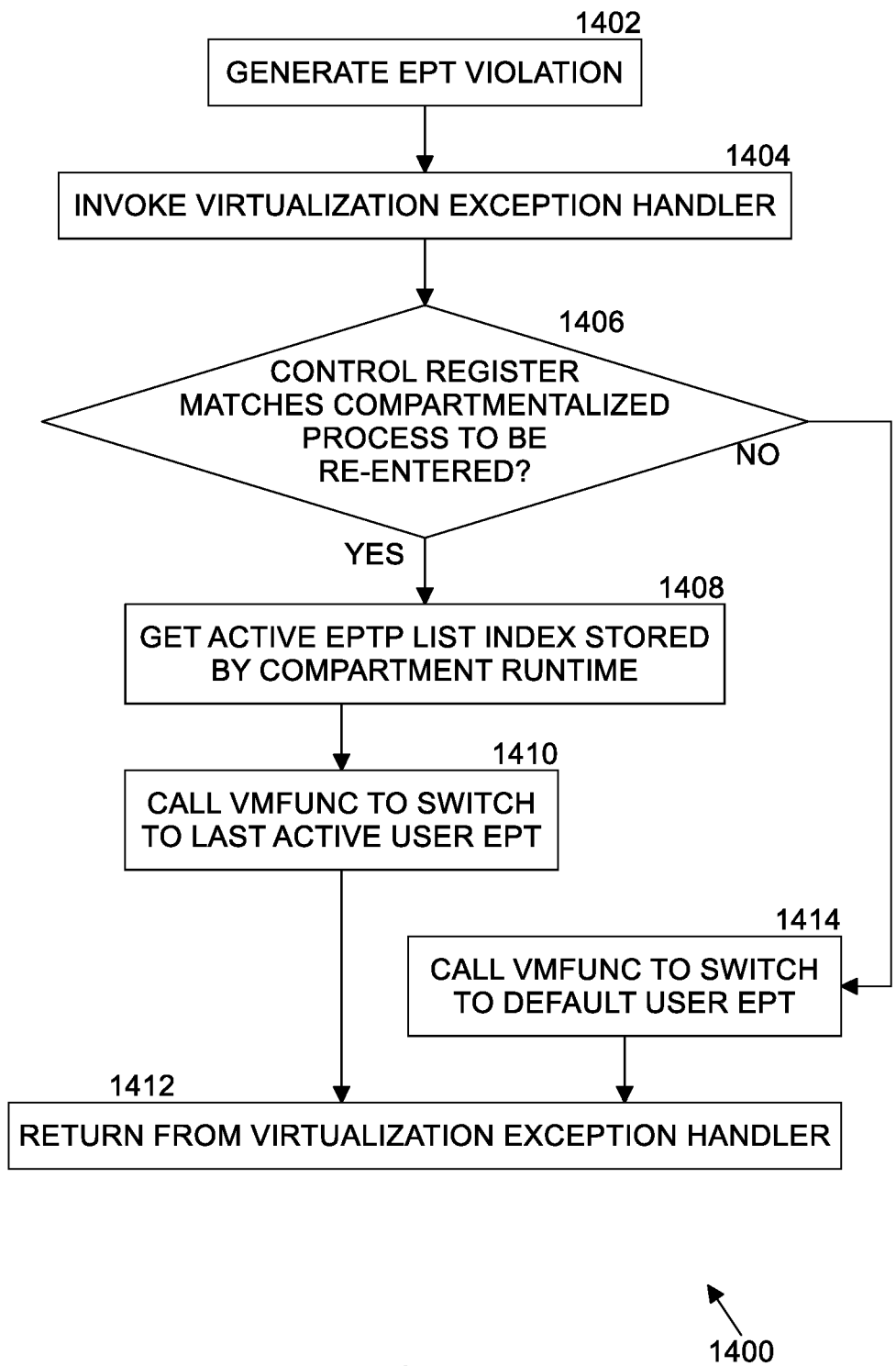
FIG. 14 illustrates EPT violation processing from kernel mode execution according to an implementation.

FIG. 14 illustrates EPT violation processing 1400 from kernel mode execution according to an implementation. When the kernel returns from a system call, exception or an interrupt, at bock 1402 an EPT violation is generated due to user execution being disabled in the EPT. At block 1404, the processor invokes VE handler 121. At block 1406, if the control register value indicates that the compartmentalized process 102 is being re-entered, then at block 1408 get the active EPT list index stored by the compartment runtime 114 from a saved variable address. At block 1410, the VE handler calls VMFUNC to switch to the last active user EPT. At block 1412, return from VE handler 121 to execute usermode code. If the control register value indicates that the compartmentalized process 102 is not being re-entered, at block 1414, VE handler 121 calls VMFUNC to switch to the default user EPT, and VE handler returns at block 1412.

Isolation between compartments can either be based on architectural isolation, cryptographic isolation, or a combination of both architectural isolation and cryptographic isolation. Architectural isolation is the existing approach (e.g., based on assigning a separate page table for each compartment). Cryptographic isolation requires each compartment to be assigned a distinct key, which can be limited according to the number of key IDs supported simultaneously by the processor. Reprogramming the keys can overcome that limit, albeit with additional overhead due to reprogramming. A hybrid approach can overcome such limits without requiring key reprogramming by using architectural isolation to define distinct address spaces and subdividing each of those address spaces using cryptographic isolation. The technology described herein describes the more general and scalable hybrid approach, cryptographic isolation is a simplification of that approach.

Figure 15:
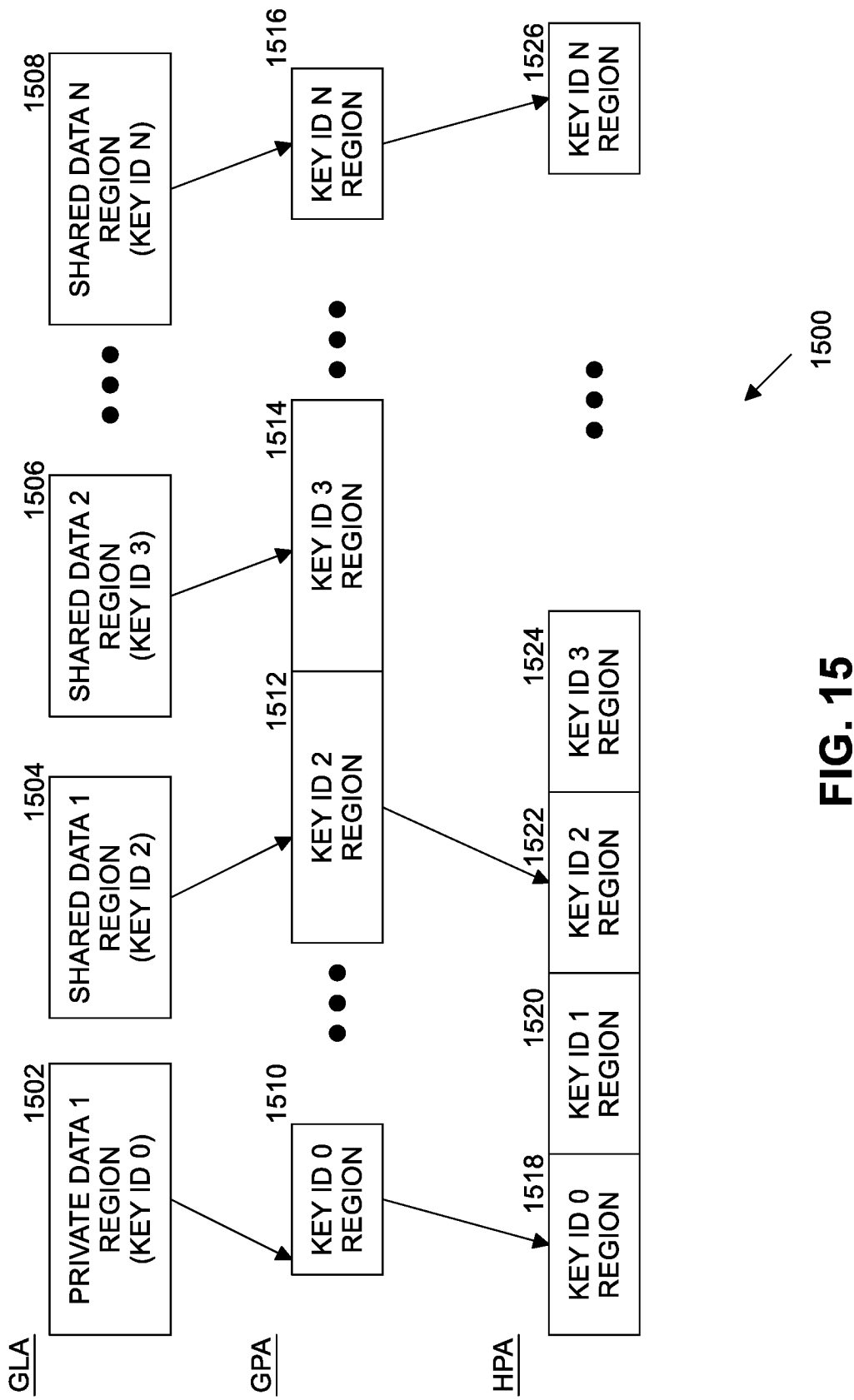
FIG. 15 illustrates data region configuration for a first compartment according to an implementation.

FIG. 15 illustrates data region configuration 1500 for a first compartment according to an implementation. The first compartment includes private data 1 region encrypted with key ID 0 1502, and shared data regions such as shared data 1 region encrypted with key ID 2 1504, shared data 2 region encrypted with key ID 3 1506, . . . shared data N region encrypted with key ID N 1508. In this example, private data 1 region 1502 may be translated to key ID 0 region 1510 in GPA, shared data 1 region 1504 may be translated to key ID 2 region 1512, shared data 2 region 1506 may be translated to key ID 3 region 1514, . . . shared data N region 1508 may be translated to key ID N region 1516. Key ID 0 region 1510 may be translated to key ID 0 region 1518 in HPA, key ID 2 region 1520 may be translated to key ID 2 region 1522, and key ID N region 1516 may be translated to key ID N region 1526. In this example, key ID 0 and key ID 1 are private HPA key IDs and key ID 2 . . . key ID N are shared HPA key IDs. In this example, there is no mapping for key ID 3 since the first compartment is not authorized to access shared data 3 region 1524.

Figure 16:
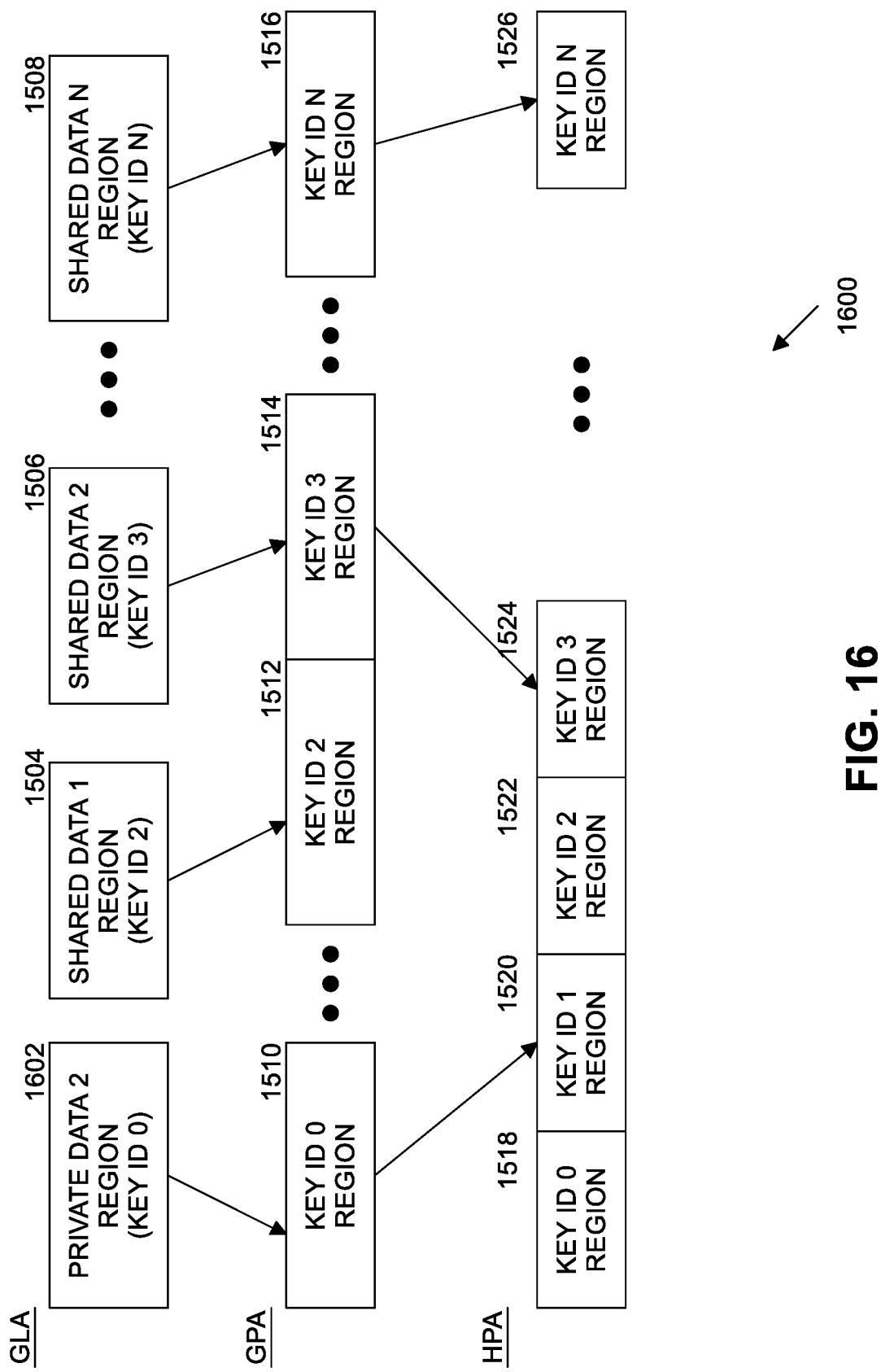
FIG. 16 illustrates data region configuration for a second compartment according to an implementation.

FIG. 16 illustrates data region configuration 1600 for a second compartment according to an implementation. The second compartment includes private data 2 region encrypted with key ID 0 1602, and shared data regions such as shared data 1 region encrypted with key ID 2 1504, shared data 2 region encrypted with key ID 3 1506, . . . shared data N region encrypted with key ID N 1508. In this example, private data 2 region 1602 may be translated to key ID 0 region 1510 in GPA, shared data 1 region 1504 may be translated to key ID 2 region 1512, shared data 2 region 1506 may be translated to key ID 3 region 1514, . . . shared data N region 1508 may be translated to key ID N region 1516. Key ID 0 region 1510 may be translated to key ID 1 region 1520 in HPA, key ID 3 region 1514 may be translated to key ID 3 region 1524, and key ID N region 1516 may be translated to key ID N region 1526. In this example, there is no mapping for key ID 2 since the first compartment is not authorized to access shared data 2 region 1522.

Note that the private data regions for both compartments are in the GLA and GPA ranges for guest key ID 0, which is the key ID for private data in this example. For simplicity, assume that a slice of GLA bits indicates the guest key ID as does a separate slice of GPA bits, and the GLA→GPA mappings are constructed accordingly, such that each guest Page Table Entry (PTE) specifies the same guest key ID as was specified in the GLA slice. Assume that most of the translations from guest key IDs in GPAs are to host key IDs in HPAs. Specifically, there may be shared key IDs. Other key ID translation schemes are possible. Key IDs in GLAS and GPAs are purely software-defined constructs that are not interpreted as key IDs by the processor in these examples. Only HPA key IDs are interpreted as key IDs by the processor in these examples.

Note that the private data regions for both compartments are in the GLA and GPA ranges for guest key ID 0, which is the key ID for private data in this example, and that the entire guest region with key ID 0 is accessible from both compartments. However, the guest key ID 0 is mapped to a different host key ID for each compartment. Thus, if a compartment accesses data in a different compartment's space, it will be garbled. Note also that the shared guest key ID ranges are accessible from both compartments, but only a subset of the guest key IDs are mapped to host key IDs based on what shared regions each compartment is authorized to access.

Figure 17:
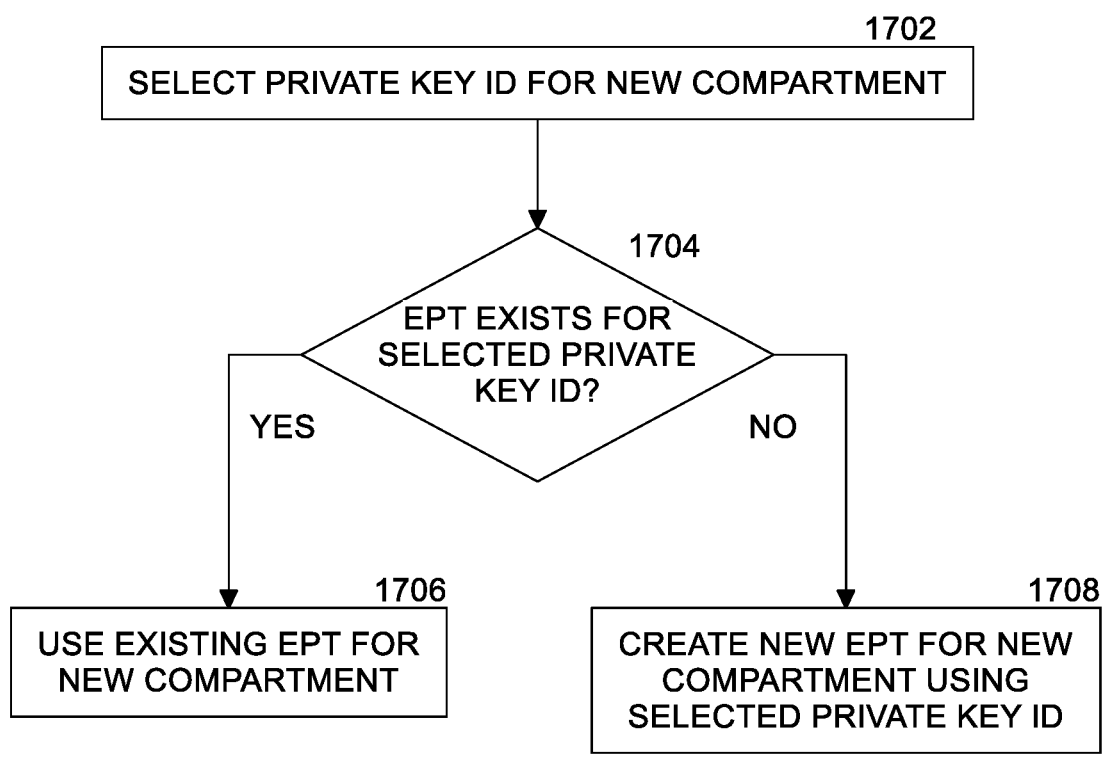
FIG. 17 illustrates selecting an EPT according to an implementation.

When a new compartment is created, compartment runtime 114 determines what EPT to use for the new compartment. FIG. 17 illustrates selecting 1700 an EPT according to an implementation. At block 1702, compartment runtime 114 selects a private key ID for the new compartment. At block 1704, if an EPT exists for the selected private key ID, then at block 1706 compartment runtime 114 uses the existing EPT for the new compartment. If an EPT does not exist for the selected private key ID, then at block 1708 compartment runtime 114 creates a new EPT for the new compartment using the selected private key ID.

Figure 18:
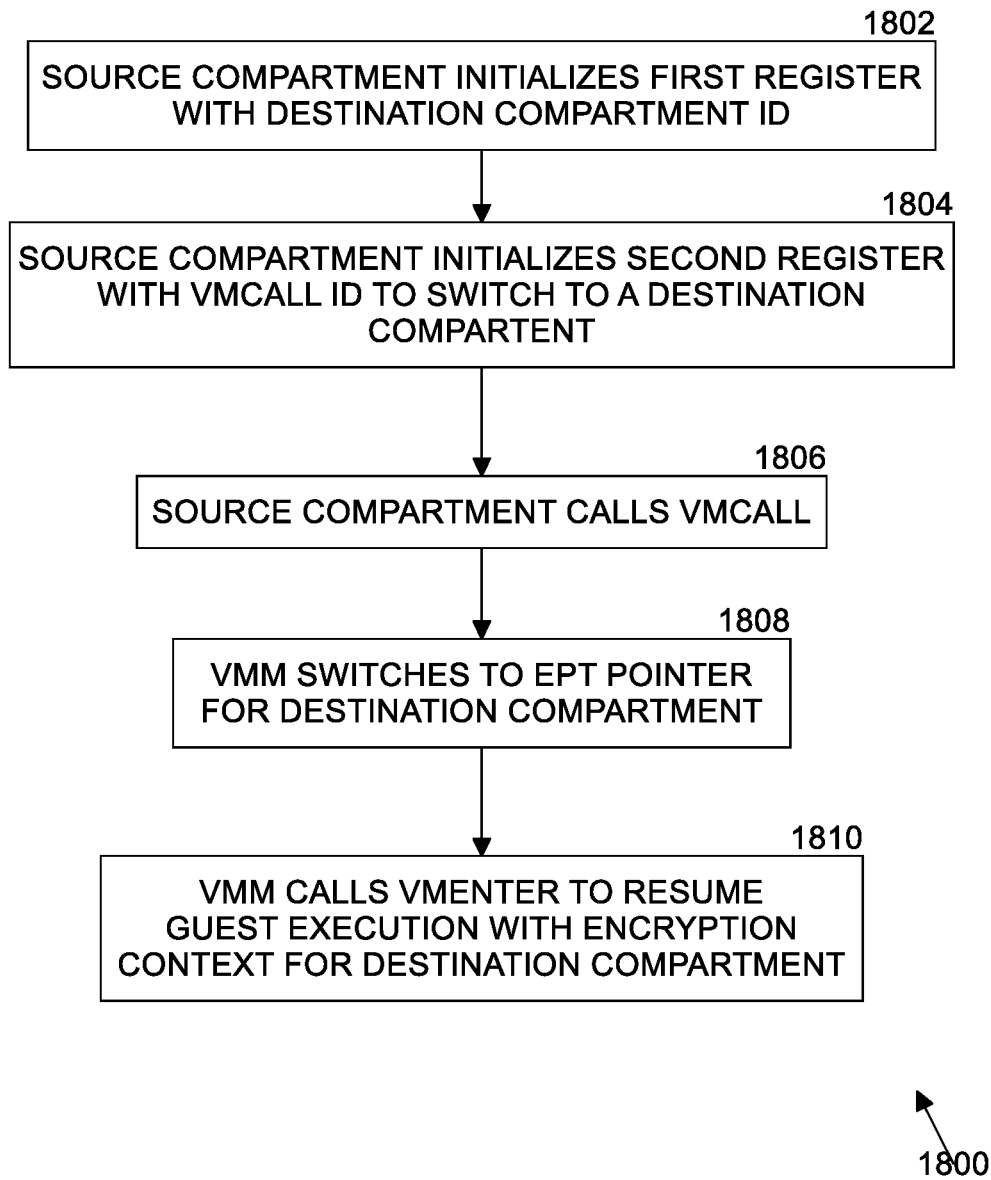
FIG. 18 illustrates switching the EPT when switching between compartments according to an implementation.

When switching between compartments, the compartment runtime switches the EPT. In an implementation, this may be done by using a VMCALL. FIG. 18 illustrates switching 1800 the EPT when switching between compartments according to an implementation. At block 1802, a source compartment (for example, compartment 1 104) initializes a first register (e.g., an RDX register in an implementation) with an ID of a destination compartment (for example, compartment 2 108). At block 1804, the source compartment initializes a second register with a VM call ID to switch to a destination compartment. At block 1806, the source compartment calls VMCALL. The VMCALL instruction exits the first compartment and invokes VMM 120. At block 1808, the VMM switches to the EPT pointer for the destination compartment. At block 1810, VMM 120 calls VMENTER to resume guest execution with encryption context for the destination compartment.

However, exiting guest execution (of the source compartment) via a VMCALL and re-entering guest execution (of the destination compartment) later is time-consuming. A more efficient alternative is available in the EPT Pointer (EPTP) switching leaf of the VMFUNC (VM Function) instruction. VMFUNC leaf 0 permits a guest process, including unprivileged code in the guest process, to select a new EPTP at a specified index from a list that has been defined by the VMM 120. Thus, the guest process can replace the VMCALL-based sequence shown above with a single VMFUNC instruction that specifies the EPTP list index for the destination compartment.

Figure 19:
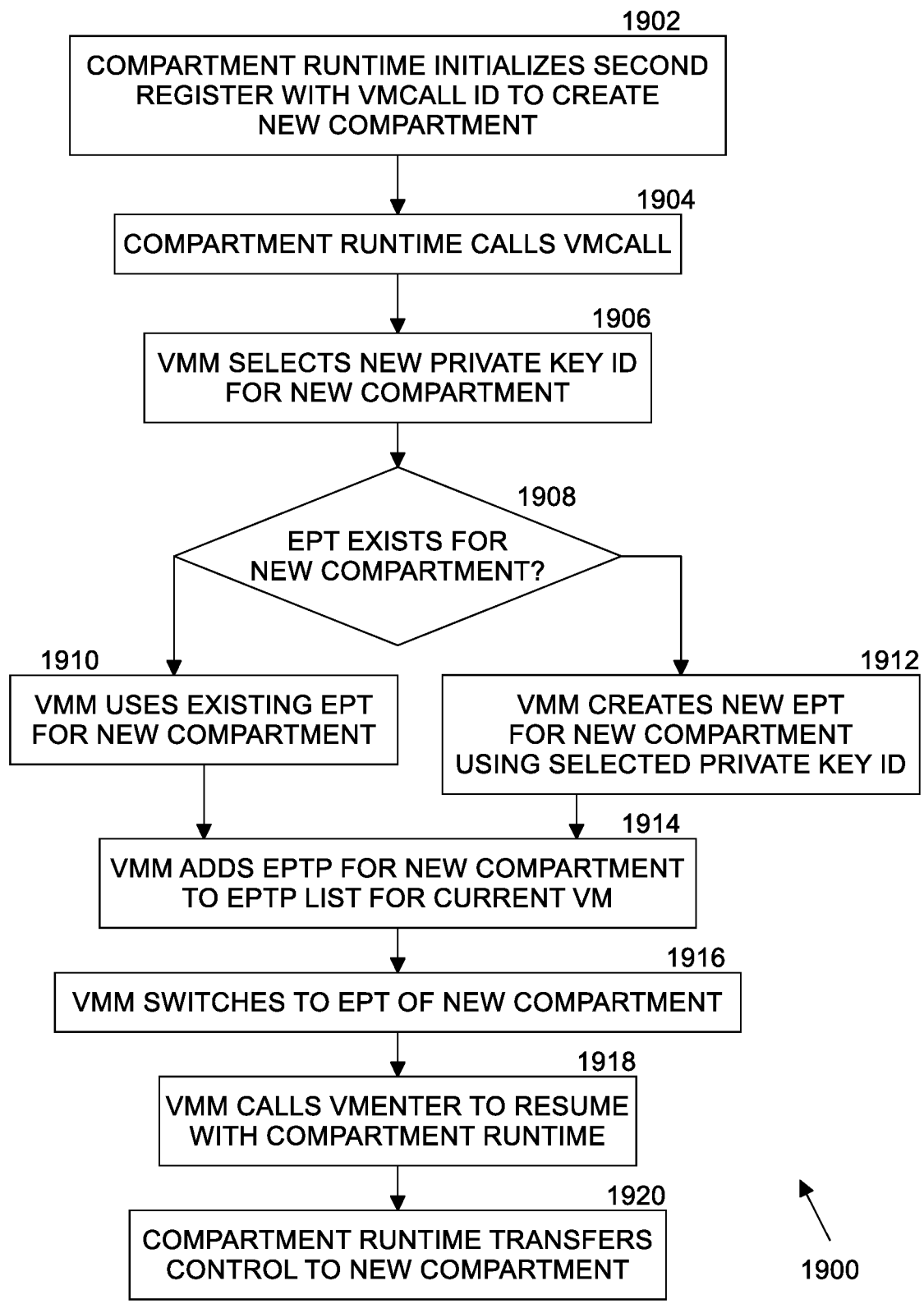
FIG. 19 illustrates adding an EPT for a new compartment to a EPT list according to an implementation.

As the new compartment is being created, the EPT for that compartment can be added to the EPTP list. FIG. 19 illustrates adding 1900 an EPT for a new compartment to a EPT list according to an implementation. At block 1902, compartment runtime 114 initializes the second register with a VMCALL ID to create a new compartment. At block 1904, compartment runtime 114 calls VMCALL. At block 1906, VMM 120 selects a new private key ID for the new compartment. At block 1908, if an EPT exists for the new compartment, at block 1910, the VMM uses the existing EPT for the new compartment. If an EPT does not exist for the new compartment, then at block 1912 the VMM creates a new EPT for the new compartment using the selected private key ID. In either case, processing continues at block 1914, where the VMM adds the EPT pointer (EPTP) for the new compartment to the EPTP list for the current virtual machine (VM). At block 1916, the VMM switches to the EPT of the new compartment. At block 1918, the VMM calls VMENTER to resume execution with the compartment runtime 114. At block 1920, compartment runtime 114 transfers control to (e.g., jumps to the entry point of) the new compartment.

For a hybrid isolation approach, an identical, pre-populated EPTP list may be shared across different address spaces. In some embodiments, more physical keys may be supported than there are entries in the EPTP list. Thus, an additional VMCALL handler or a VMFUNC leaf function may be used for switching the EPTP list. For example, a VMCS field may refer to a list of authorized EPTP list pointers, and a new VMFUNC leaf may specify an index in that list from which to load an EPTP list pointer into the EPTP list pointer VMCS field.

While an example manner of implementing the technology described herein is illustrated in FIGS. 1-19, one or more of the elements, processes, and/or devices illustrated in FIGS. 1-19 may be combined, divided, re-arranged, omitted, eliminated, and/or implemented in any other way. Further, the example computing system 100 may be implemented by hardware, software, firmware, and/or any combination of hardware, software, and/or firmware. Thus, for example, any part of computing system 100 may be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example hardware resources is/are hereby expressly defined to include a non-transitory computer readable storage device or storage disk such as a memory, a digital versatile disk (DVD), a compact disk (CD), a Blu-ray disk, etc., including the software and/or firmware. Further still, the example circuitry of FIGS. 1-19 may include one or more elements, processes, and/or devices in addition to, or instead of, those illustrated in FIGS. 1-19, and/or may include more than one of any or all the illustrated elements, processes and devices.

Diagrams representative of example hardware logic circuitry, machine readable instructions, hardware implemented state machines, and/or any combination thereof is shown in FIGS. 1-19. The machine readable instructions may be one or more executable programs or portion(s) of an executable program for execution by processor circuitry, such as the processor circuitry 2012 shown in the example processor platform 2000 discussed below in connection with FIG. 20 and/or the example processor circuitry discussed below in connection with FIGS. 21 and/or 22. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The tangible machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the diagrams illustrated in FIGS. 1-19, many other methods of implementing the example computing system may alternatively be used. For example, the order of execution of the blocks may be changed, and/or some of the blocks described may be changed, eliminated, or combined. Additionally or alternatively, any or all of the blocks shown in FIGS. 1-19 may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine readable media, as used herein, may include machine readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 1-19 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 20:
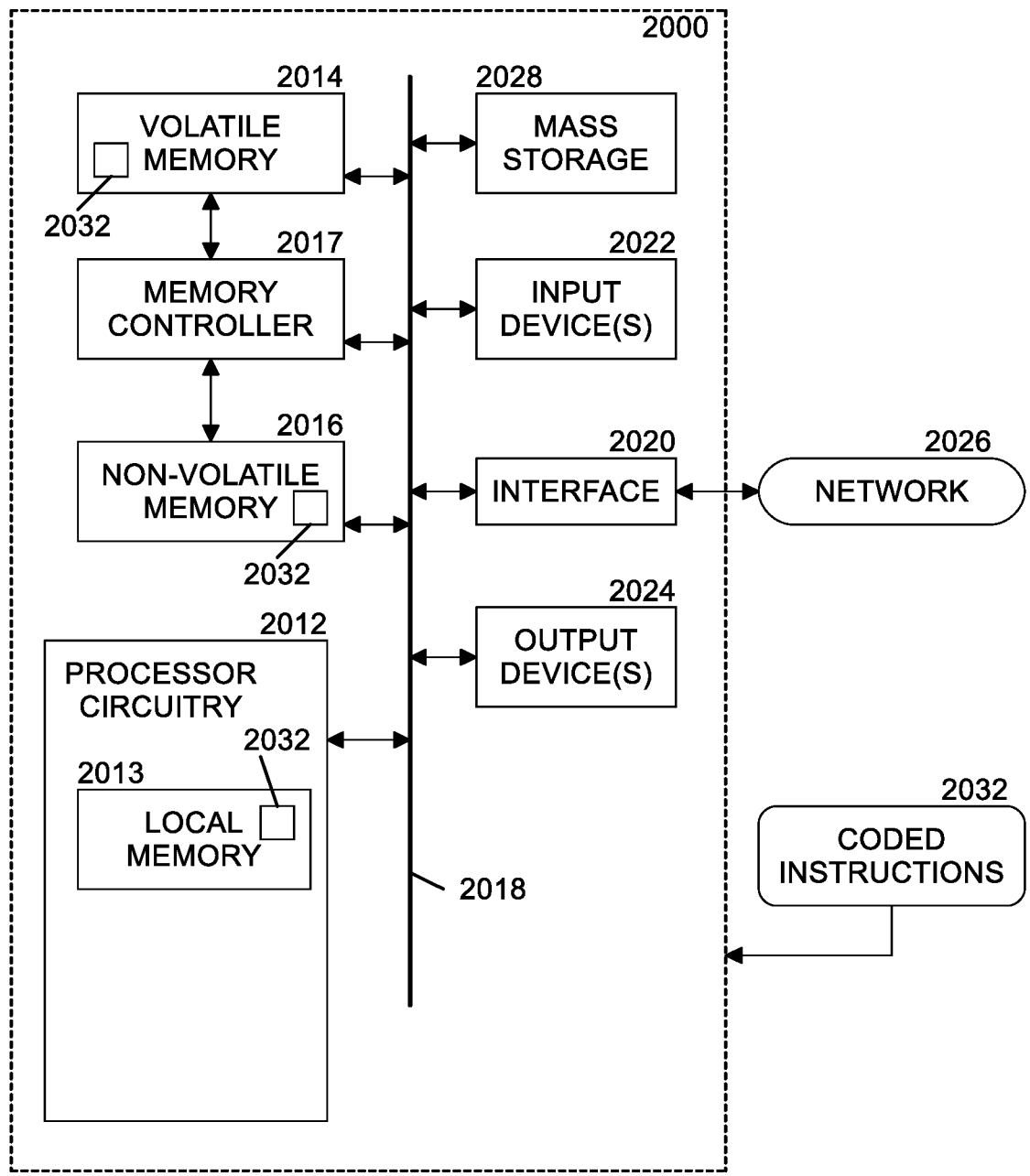
FIG. 20 is a block diagram of an example processor platform structured to execute and/or instantiate the machine-readable instructions and/or operations of FIGS. 1-19 to implement the apparatus discussed with reference to FIGS. 1-19.

FIG. 20 is a block diagram of an example processor platform 2000 structured to execute and/or instantiate the machine-readable instructions and/or operations of FIGS. 1-19. The processor platform 2000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 2000 of the illustrated example includes processor circuitry 2012. The processor circuitry 2012 of the illustrated example is hardware. For example, the processor circuitry 2012 can be implemented by one or more integrated circuits, logic circuits, FPGAs microprocessors, CPUs, GPUs, DSPs, and/or microcontrollers from any desired family or manufacturer. The processor circuitry 2012 may be implemented by one or more semiconductor based (e.g., silicon based) devices.

The processor circuitry 2012 of the illustrated example includes a local memory 2013 (e.g., a cache, registers, etc.). The processor circuitry 2012 of the illustrated example is in communication with a main memory including a volatile memory 2014 and a non-volatile memory 2016 by a bus 2018. The volatile memory 2014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 2016 may be implemented by flash memory and/or any other desired type of memory device. Access to the main memory 2014, 2016 of the illustrated example is controlled by a memory controller 2017.

The processor platform 2000 of the illustrated example also includes interface circuitry 2020. The interface circuitry 2020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 2022 are connected to the interface circuitry 2020. The input device(s) 2022 permit(s) a user to enter data and/or commands into the processor circuitry 2012. The input device(s) 2022 can be implemented by, for example, an audio sensor, a microphone, a camera (still or video), a keyboard, a button, a mouse, a touchscreen, a trackpad, a trackball, an isopoint device, and/or a voice recognition system.

One or more output devices 2024 are also connected to the interface circuitry 2020 of the illustrated example. The output devices 2024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 2020 of the illustrated example, thus, typically includes a graphics driver card, a graphics driver chip, and/or graphics processor circuitry such as a GPU.

The interface circuitry 2020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 2000 of the illustrated example also includes one or more mass storage devices 2028 to store software and/or data. Examples of such mass storage devices 2028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 2032, which may be implemented by the machine-readable instructions of FIGS. 1-19, may be stored in the mass storage device 2028, in the volatile memory 2014, in the non-volatile memory 2016, and/or on a removable non-transitory computer readable storage medium such as a CD or DVD.

Figure 21:
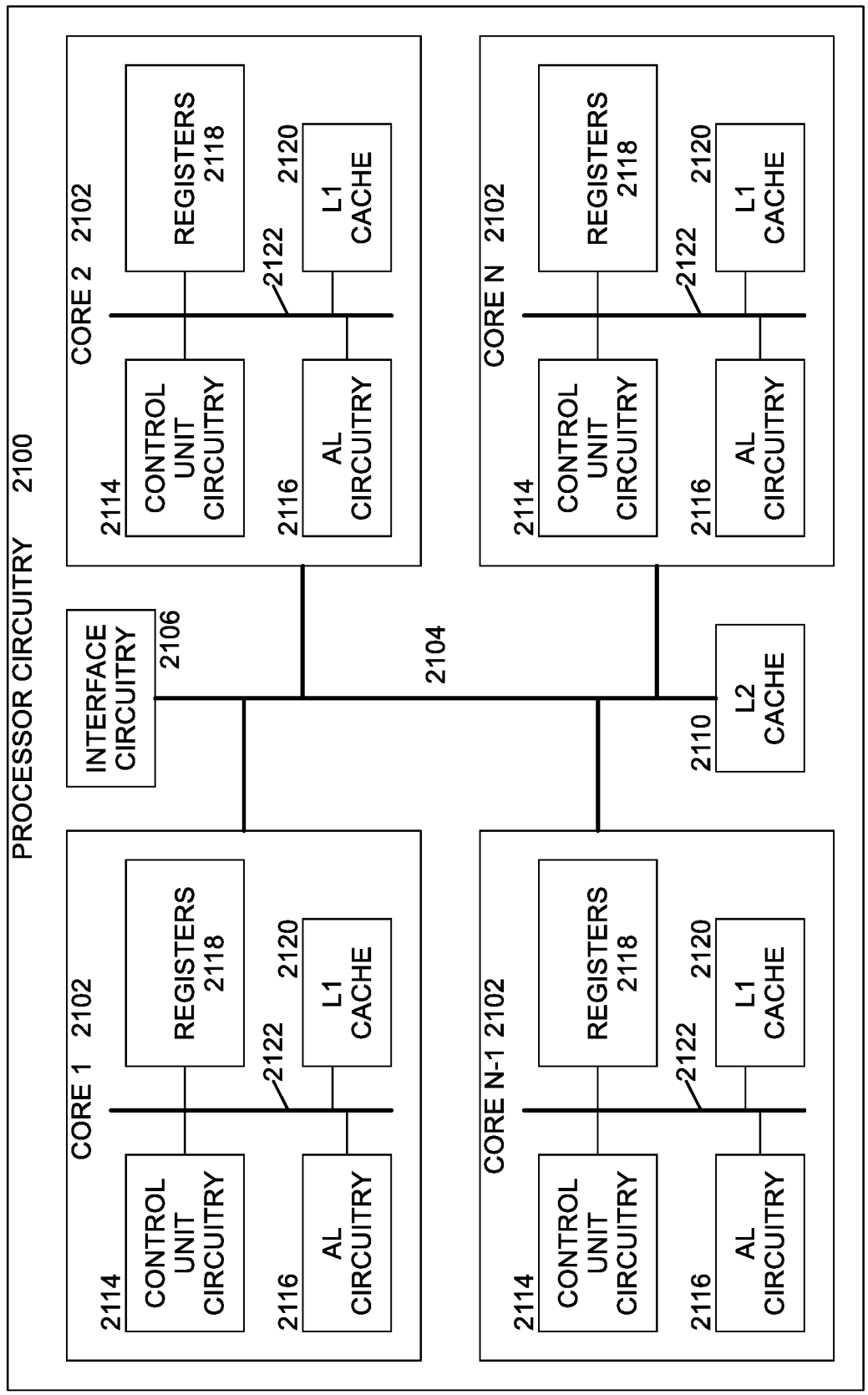
FIG. 21 is a block diagram of an example implementation of the processor circuitry of FIG. 20.

FIG. 21 is a block diagram of an example implementation of the processor circuitry 2012 of FIG. 20. In this example, the processor circuitry 2012 of FIG. 20 is implemented by a microprocessor 2100. For example, the microprocessor 2100 may implement multi-core hardware circuitry such as a CPU, a DSP, a GPU, an XPU, etc. Although it may include any number of example cores 2102 (e.g., 1 core), the microprocessor 2100 of this example is a multi-core semiconductor device including N cores. The cores 2102 of the microprocessor 2100 may operate independently or may cooperate to execute machine readable instructions. For example, machine code corresponding to a firmware program, an embedded software program, or a software program may be executed by one of the cores 2102 or may be executed by multiple ones of the cores 2102 at the same or different times. In some examples, the machine code corresponding to the firmware program, the embedded software program, or the software program is split into threads and executed in parallel by two or more of the cores 2102. The software program may correspond to a portion or all the machine-readable instructions and/or operations represented by the diagrams of FIGS. 1-19.

The cores 2102 may communicate by an example bus 2104. In some examples, the bus 2104 may implement a communication bus to effectuate communication associated with one(s) of the cores 2102. For example, the bus 2104 may implement at least one of an Inter-Integrated Circuit (I2C) bus, a Serial Peripheral Interface (SPI) bus, a PCI bus, or a PCIe bus. Additionally or alternatively, the bus 2104 may implement any other type of computing or electrical bus. The cores 2102 may obtain data, instructions, and/or signals from one or more external devices by example interface circuitry 2106. The cores 2102 may output data, instructions, and/or signals to the one or more external devices by the interface circuitry 2106. Although the cores 2102 of this example include example local memory 2120 (e.g., Level 1 (L1) cache that may be split into an L1 data cache and an L1 instruction cache), the microprocessor 2100 also includes example shared memory 2110 that may be shared by the cores (e.g., Level 2 (L2) cache)) for high-speed access to data and/or instructions. Data and/or instructions may be transferred (e.g., shared) by writing to and/or reading from the shared memory 2110. The local memory 2120 of each of the cores 2102 and the shared memory 2110 may be part of a hierarchy of storage devices including multiple levels of cache memory and the main memory (e.g., the main memory 2014, 2016 of FIG. 20). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2102 may be referred to as a CPU, DSP, GPU, etc., or any other type of hardware circuitry. Each core 2102 includes control unit circuitry 2114, arithmetic and logic (AL) circuitry (sometimes referred to as an ALU) 2116, a plurality of registers 2118, the L1 cache in local memory 2120, and an example bus 2122. Other structures may be present. For example, each core 2102 may include vector unit circuitry, single instruction multiple data (SIMD) unit circuitry, load/store unit (LSU) circuitry, branch/jump unit circuitry, floating-point unit (FPU) circuitry, etc. The control unit circuitry 2114 includes semiconductor-based circuits structured to control (e.g., coordinate) data movement within the corresponding core 2102. The AL circuitry 2116 includes semiconductor-based circuits structured to perform one or more mathematic and/or logic operations on the data within the corresponding core 2102. The AL circuitry 2116 of some examples performs integer-based operations. In other examples, the AL circuitry 2116 also performs floating point operations. In yet other examples, the AL circuitry 2116 may include first AL circuitry that performs integer-based operations and second AL circuitry that performs floating point operations. In some examples, the AL circuitry 2116 may be referred to as an Arithmetic Logic Unit (ALU). The registers 2118 are semiconductor-based structures to store data and/or instructions such as results of one or more of the operations performed by the AL circuitry 2116 of the corresponding core 2102. For example, the registers 2118 may include vector register(s), SIMD register(s), general purpose register(s), flag register(s), segment register(s), machine specific register(s), instruction pointer register(s), control register(s), debug register(s), memory management register(s), machine check register(s), etc. The registers 2118 may be arranged in a bank as shown in FIG. 21. Alternatively, the registers 2118 may be organized in any other arrangement, format, or structure including distributed throughout the core 2102 to shorten access time. The bus 2104 may implement at least one of an I2C bus, a SPI bus, a PCI bus, or a PCIe bus.

Each core 2102 and/or, more generally, the microprocessor 2100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general-purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 22:
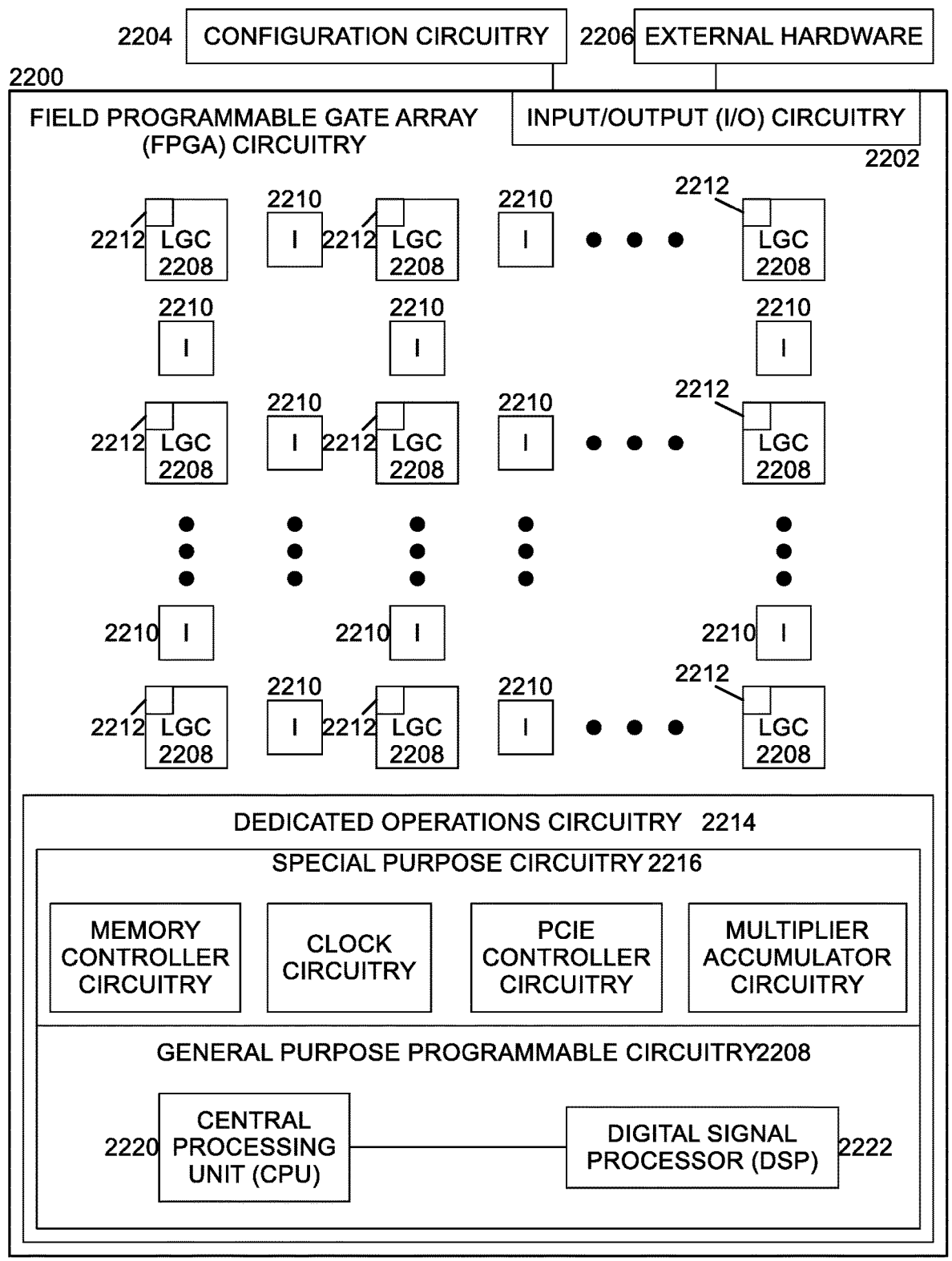
FIG. 22 is a block diagram of another example implementation of the processor circuitry of FIG. 20.

FIG. 22 is a block diagram of another example implementation of the processor circuitry 2021 of FIG. 20. In this example, the processor circuitry 2012 is implemented by FPGA circuitry 2200. The FPGA circuitry 2200 can be used, for example, to perform operations that could otherwise be performed by the example microprocessor 2100 of FIG. 21 executing corresponding machine-readable instructions. However, once configured, the FPGA circuitry 2200 instantiates the machine-readable instructions in hardware and, thus, can often execute the operations faster than they could be performed by a general-purpose microprocessor executing the corresponding software.

More specifically, in contrast to the microprocessor 2100 of FIG. 21 described above (which is a general purpose device that may be programmed to execute some or all of the machine readable instructions represented by the diagrams of FIGS. 1-19 but whose interconnections and logic circuitry are fixed once fabricated), the FPGA circuitry 2200 of the example of FIG. 22 includes interconnections and logic circuitry that may be configured and/or interconnected in different ways after fabrication to instantiate, for example, some or all of the machine readable instructions represented by the diagrams of FIGS. 1-19. In particular, the FPGA 2200 may be thought of as an array of logic gates, interconnections, and switches. The switches can be programmed to change how the logic gates are interconnected by the interconnections, effectively forming one or more dedicated logic circuits (unless and until the FPGA circuitry 2200 is reprogrammed). The configured logic circuits enable the logic gates to cooperate in different ways to perform different operations on data received by input circuitry. Those operations may correspond to some or all of the software represented by the diagrams of FIGS. 1-19. As such, the FPGA circuitry 2200 may be structured to effectively instantiate some or all the machine-readable instructions of the diagrams of FIGS. 1-19 as dedicated logic circuits to perform the operations corresponding to those software instructions in a dedicated manner analogous to an ASIC. Therefore, the FPGA circuitry 2200 may perform the operations corresponding to the some or all the machine-readable instructions of FIGS. 1-19 faster than the general-purpose microprocessor can execute the same.

In the example of FIG. 22, the FPGA circuitry 2200 is structured to be programmed (and/or reprogrammed one or more times) by an end user by a hardware description language (HDL) such as Verilog. The FPGA circuitry 2200 of FIG. 22, includes example input/output (I/O) circuitry 2202 to obtain and/or output data to/from example configuration circuitry 2204 and/or external hardware (e.g., external hardware circuitry) 2206. For example, the configuration circuitry 2204 may implement interface circuitry that may obtain machine readable instructions to configure the FPGA circuitry 2200, or portion(s) thereof. In some such examples, the configuration circuitry 2204 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2206 may implement the microprocessor 2100 of FIG. 21. The FPGA circuitry 2200 also includes an array of example logic gate circuitry 2208, a plurality of example configurable interconnections 2210, and example storage circuitry 2212. The logic gate circuitry 2208 and interconnections 2210 are configurable to instantiate one or more operations that may correspond to at least some of the machine-readable instructions of FIGS. 1-19 and/or other desired operations. The logic gate circuitry 2208 shown in FIG. 22 is fabricated in groups or blocks. Each block includes semiconductor-based electrical structures that may be configured into logic circuits. In some examples, the electrical structures include logic gates (e.g., AND gates, OR gates, NOR gates, etc.) that provide basic building blocks for logic circuits. Electrically controllable switches (e.g., transistors) are present within each of the logic gate circuitry 2208 to enable configuration of the electrical structures and/or the logic gates to form circuits to perform desired operations. The logic gate circuitry 2208 may include other electrical structures such as look-up tables (LUTs), registers (e.g., flip-flops or latches), multiplexers, etc.

The interconnections 2210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2208 to program desired logic circuits.

The storage circuitry 2212 of the illustrated example is structured to store result(s) of the one or more of the operations performed by corresponding logic gates. The storage circuitry 2212 may be implemented by registers or the like. In the illustrated example, the storage circuitry 2212 is distributed amongst the logic gate circuitry 2208 to facilitate access and increase execution speed.

The example FPGA circuitry 2200 of FIG. 22 also includes example Dedicated Operations Circuitry 2214. In this example, the Dedicated Operations Circuitry 2214 includes special purpose circuitry 2216 that may be invoked to implement commonly used functions to avoid the need to program those functions in the field. Examples of such special purpose circuitry 2216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2200 may also include example general purpose programmable circuitry 2218 such as an example CPU 2220 and/or an example DSP 2222. Other general purpose programmable circuitry 2218 may additionally or alternatively be present such as a GPU, an XPU, etc., that can be programmed to perform other operations.

Although FIGS. 21 and 22 illustrate two example implementations of the processor circuitry 2012 of FIG. 20, many other approaches are contemplated. For example, as mentioned above, modern FPGA circuitry may include an on-board CPU, such as one or more of the example CPU 2220 of FIG. 22. Therefore, the processor circuitry 2012 of FIG. 20 may additionally be implemented by combining the example microprocessor 2100 of FIG. 21 and the example FPGA circuitry 2200 of FIG. 22. In some such hybrid examples, a first portion of the machine-readable instructions represented by the diagrams of FIGS. 1-10 may be executed by one or more of the cores 2102 of FIG. 21 and a second portion of the machine-readable instructions represented by the diagrams of FIGS. 1-19 may be executed by the FPGA circuitry 2200 of FIG. 22.

In some examples, the processor circuitry 2012 of FIG. 20 may be in one or more packages. For example, the processor circuitry 2100 of FIG. 21 and/or the FPGA circuitry 2200 of FIG. 22 may be in one or more packages. In some examples, an XPU may be implemented by the processor circuitry 2012 of FIG. 20, which may be in one or more packages. For example, the XPU may include a CPU in one package, a DSP in another package, a GPU in yet another package, and an FPGA in still yet another package.

Figure 23:
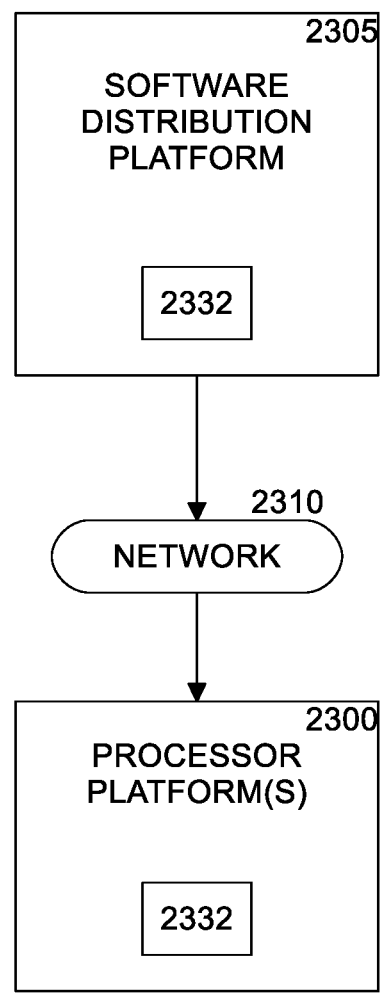
FIG. 23 is a block diagram illustrating an example software distribution platform to distribute software such as the example machine readable instructions of FIG. 20 to hardware devices owned and/or operated by third parties.

A block diagram illustrating an example software distribution platform 2305 to distribute software such as the example machine readable instructions 2032 of FIG. 20 to hardware devices owned and/or operated by third parties is illustrated in FIG. 23. The example software distribution platform 2305 may be implemented by any computer server, data facility, cloud service, etc., capable of storing and transmitting software to other computing devices. The third parties may be customers of the entity owning and/or operating the software distribution platform 2305. For example, the entity that owns and/or operates the software distribution platform 2305 may be a developer, a seller, and/or a licensor of software such as the example machine readable instructions 2032 of FIG. 20. The third parties may be consumers, users, retailers, OEMs, etc., who purchase and/or license the software for use and/or re-sale and/or sub-licensing. In the illustrated example, the software distribution platform 2305 includes one or more servers and one or more storage devices. The storage devices store the machine-readable instructions 2032, which may correspond to the example machine readable instructions, as described above. The one or more servers of the example software distribution platform 2305 are in communication with a network 2310, which may correspond to any one or more of the Internet and/or any of the example networks, etc., described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 2032 from the software distribution platform 2305. For example, the software, which may correspond to the example machine readable instructions described above, may be downloaded to the example processor platform 2300, which is to execute the machine-readable instructions 2032 to implement the methods described above and associated computing system 100. In some examples, one or more servers of the software distribution platform 2305 periodically offer, transmit, and/or force updates to the software (e.g., the example machine readable instructions 2032 of FIG. 20) to ensure improvements, patches, updates, etc., are distributed and applied to the software at the end user devices.

In some examples, an apparatus includes means for data processing of FIGS. 1-19. For example, the means for processing may be implemented by processor circuitry, processor circuitry, firmware circuitry, other circuitry, etc. In some examples, the processor circuitry may be implemented by machine executable instructions executed by processor circuitry, which may be implemented by the example processor circuitry 2012 of FIG. 20, the example processor circuitry 2100 of FIG. 21, and/or the example Field Programmable Gate Array (FPGA) circuitry 2200 of FIG. 22. In other examples, the processor circuitry is implemented by other hardware logic circuitry, hardware implemented state machines, and/or any other combination of hardware, software, and/or firmware. For example, the processor circuitry may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

From the foregoing, it will be appreciated that example systems, methods, apparatus, and articles of manufacture have been disclosed that provide cryptographic isolation of threads in a computing system. The disclosed systems, methods, apparatus, and articles of manufacture improve the security of a computing device. The disclosed systems, methods, apparatus, and articles of manufacture are accordingly directed to one or more improvement(s) in the operation of a machine such as a computer or other electronic and/or mechanical device.

EXAMPLES

Example 1 is a method including selecting a first key identifier (ID) for a first compartment of a compartmentalized process of a computing system, the first compartment including first private data; assigning a first extended page table (EPT) having at least one memory address including the first key ID to the first compartment; encrypting the first private data with a first key associated with the first key ID; and storing the encrypted first private data in a memory starting at the at least one memory address of the first EPT. In Example 2, the subject matter of Example 1 may optionally include retrieving the encrypted first private data from the memory by the first compartment using the first EPT; and decrypting the encrypted first private data with the first key. In Example 3, the subject matter of Example 1 may optionally include selecting a second key identifier (ID) for a second compartment of the compartmentalized process of the computing system, the second compartment including second private data; assigning a second EPT having at least one memory address including the second key ID to the second compartment; encrypting the second private data with a second key associated with the second key ID; and storing the encrypted second private data in the memory starting at the at least one memory address of the second EPT.

In Example 4, the subject matter of Example 3 may optionally include retrieving the encrypted second private data from the memory by the first compartment using the first EPT; attempting to successfully decrypt the encrypted second private data with the first key; and failing to successfully decrypt the encrypted second private data with the first key. In Example 5, the subject matter of Example 3 may optionally include retrieving the encrypted first private data from the memory by the second compartment using the second EPT; attempting to successfully decrypt the encrypted first private data with the second key; and failing to successfully decrypt the encrypted first private data with the second key. In Example 6, the subject matter of Example 3 may optionally include retrieving the encrypted second private data from the memory by the second compartment using the second EPT; and successfully decrypting the encrypted second private data with the second key. In Example 7, the subject matter of Example 3 may optionally include selecting a third key ID for data shared by the first compartment and the second compartment; assigning a third EPT having at least one memory address including the third key ID t the first compartment and the second compartment; encrypting the shared data with a third key associated with the third key; and storing the encrypted shared data in the memory starting at the at least one memory address of the third EPT.

In Example 8, the subject matter of Example 7 may optionally include retrieving the encrypted shared data from the memory by at least one of the first compartment and the second compartment using the third EPT; and successfully decrypting, by at least one of the first compartment and the second compartment, the encrypted shared data with the third key. In Example 9, the subject matter of Example 7 may optionally include translating a first guest linear address of the first private data into a first guest physical address for the first compartment by a guest page table; translating a second guest linear address of the second private data into a second guest physical address for the second compartment by the guest page table; and translating a third guest linear address of the shared data into a third guest physical address for at least one of the first compartment and the second compartment by the guest page table. In Example 10, the subject matter of Example may optionally include wherein a first linear address range of guest linear addresses of the first private data is different than a third linear address range of guest linear addresses of the shared data, and a second linear address range of guest linear addresses of the second private data is different than the third linear address range of guest linear addresses of the shared data.

In Example 11, the subject matter of Example 7 may optionally include the first EPT, the second EPT, and the third EPT being included in a virtual machine manager (VMM) of the computing system. In Example 12, the subject matter of Example 11 may optionally include switching, by the VMM, from the first EPT for the first compartment to the second EPT for the second compartment. In Example 13, the subject matter of Example 11 may optionally include switching, by the VMM, from the second EPT for the second compartment to the first EPT for the first compartment. In Example 14, the subject matter of Example 10 may optionally include switching, by executing a VMFUNC instruction, from the first EPT for the first compartment to the second EPT for the second compartment.

Example 15 is at least one machine-readable storage medium comprising instructions which, when executed by at least one processor, cause the at least one processor to select a first key identifier (ID) for a first compartment of a compartmentalized process of a computing system, the first compartment including first private data; assign a first extended page table (EPT) having at least one memory address including the first key ID to the first compartment; encrypt the first private data with a first key associated with the first key ID; and store the encrypted first private data in a memory starting at the at least one memory address of the first EPT. In Example 16, the subject matter of Example 15 may optionally include instructions which, when executed by at least one processor, cause the at least one processor to retrieve the encrypted first private data from the memory by the first compartment using the first EPT; and decrypt the encrypted first private data with the first key. In Example 17, the subject matter of Example 15 may optionally include instructions which, when executed by at least one processor, cause the at least one processor to select a second key identifier (ID) for a second compartment of the compartmentalized process of the computing system, the second compartment including second private data; assign a second EPT having at least one memory address including the second key ID to the second compartment; encrypt the second private data with a second key associated with the second key ID; and store the encrypted second private data in the memory starting at the at least one memory address of the second EPT.

In Example 18, the subject matter of Example 17 may optionally include instructions which, when executed by at least one processor, cause the at least one processor to retrieve the encrypted second private data from the memory by the first compartment using the first EPT; attempt to successfully decrypt the encrypted second private data with the first key; and fail to successfully decrypt the encrypted second private data with the first key. In Example 19, the subject matter of Example 13 may optionally include instructions which, when executed by at least one processor, cause the at least one processor to retrieve the encrypted first private data from the memory by the second compartment using the second EPT; attempt to successfully decrypt the encrypted first private data with the second key; and fail to successfully decrypt the encrypted first private data with the second key. In Example 20, the subject matter of Example 13 may optionally include instructions which, when executed by at least one processor, cause the at least one processor to retrieve the encrypted second private data from the memory by the second compartment using the second EPT; and successfully decrypt the encrypted second private data with the second key.

Example 21 is an apparatus comprising a memory to store private data; and a processor to select a first key identifier (ID) for a first compartment of a compartmentalized process of the processor, the first compartment including first private data; assign a first extended page table (EPT) having at least one memory address including the first key ID; encrypt the first private data with a first key associated with the first key ID; and store the encrypted first private data in the memory starting at the at least one memory address of the first EPT. In Example 22, the subject matter of Example 21 may optionally include the processor to retrieve the encrypted first private data from the memory by the first compartment using the first EPT; and decrypt the encrypted first private data with the first key. In Example 23, the subject matter of Example 21 may optionally include the processor to select a second key identifier (ID) for a second compartment of the compartmentalized process of the processor, the second compartment including second private data; assign a second EPT having at least one memory address including the second key ID; encrypt the second private data with a second key associated with the second key ID; and store the encrypted second private data in the memory starting at the at least one memory address of the second EPT. In Example 24, the subject matter of Example 23 may optionally include the processor to retrieve the encrypted second private data from the memory by the first compartment using the first EPT; attempt to successfully decrypt the encrypted second private data with the first key; and fail to successfully decrypt the encrypted second private data with the first key. In Example 25, the subject matter of Example 23 may optionally include the processor to retrieve the encrypted first private data from the memory by the second compartment using the second EPT; attempt to successfully decrypt the encrypted first private data with the second key; and fail to successfully decrypt the encrypted first private data with the second key. In Example 26, the subject matter of Example 23 may optionally include the processor to retrieve the encrypted second private data from the memory by the second compartment using the second EPT; and successfully decrypt the encrypted second private data with the second key.

Example 27 is an apparatus operative to perform the method of any one of Examples 1 to 14. Example 28 is an apparatus that includes means for performing the method of any one of Examples 1 to 14. Example 29 is an apparatus that includes any combination of modules and/or units and/or logic and/or circuitry and/or means operative to perform the method of any one of Examples 1 to 14. Example 30 is an optionally non-transitory and/or tangible machine-readable medium, which optionally stores or otherwise provides instructions that if and/or when executed by a computer system or other machine are operative to cause the machine to perform the method of any one of Examples 1 to 14.

References to "an implementation," "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the examples of this patent.

What is claimed is:

1. A method comprising:
    selecting a first key identifier (ID) for a first compartment of a compartmentalized process of a computing system, the first compartment including first private data;
    selecting a second key ID for a second compartment of the compartmentalized process of the computing system, the second compartment including second private data;
    assigning a first extended page table (EPT) having at least one memory address including the first key ID to the first compartment;
    assigning a second EPT having at least one memory address including the second key ID to the second compartment;
    encrypting the first private data with a first key associated with the first key ID;
    storing the encrypted first private data in a memory starting at the at least one memory address of the first EPT; and
    switching, by a virtual machine manager (VMM), from the first EPT for the first compartment to the second EPT for the second compartment.

2. The method of claim 1, comprising:
retrieving the encrypted first private data from the memory by the first compartment using the first EPT; and
decrypting the encrypted first private data with the first key.

3. The method of claim 1, comprising:
encrypting the second private data with a second key associated with the second key ID; and
storing the encrypted second private data in the memory starting at the at least one memory address of the second EPT.

4. The method of claim 3, comprising:
retrieving the encrypted second private data from the memory by the first compartment using the first EPT;
attempting to successfully decrypt the encrypted second private data with the first key; and
failing to successfully decrypt the encrypted second private data with the first key.

5. The method of claim 3, comprising:
retrieving the encrypted first private data from the memory by the second compartment using the second EPT;
attempting to successfully decrypt the encrypted first private data with the second key; and
failing to successfully decrypt the encrypted first private data with the second key.

6. The method of claim 3, comprising:
retrieving the encrypted second private data from the memory by the second compartment using the second EPT; and
successfully decrypting the encrypted second private data with the second key.

7. The method of claim 3, comprising:
selecting a third key ID for data shared by the first compartment and the second compartment;
assigning a third EPT having at least one memory address including the third key ID to the first compartment and the second compartment;
encrypting the shared data with a third key associated with the third key ID; and
storing the encrypted shared data in the memory starting at the at least one memory address of the third EPT.

8. The method of claim 7, comprising:
retrieving the encrypted shared data from the memory by at least one of the first compartment and the second compartment using the third EPT; and
successfully decrypting, by at least one of the first compartment and the second compartment, the encrypted shared data with the third key.

9. The method of claim 7, comprising:
translating a first guest linear address of the first private data into a first guest physical address for the first compartment by a guest page table;
translating a second guest linear address of the second private data into a second guest physical address for the second compartment by the guest page table; and
translating a third guest linear address of the shared data into a third guest physical address for at least one of the first compartment and the second compartment by the guest page table.

10. The method of claim 9, wherein a first linear address range of guest linear addresses of the first private data is different than a third linear address range of guest linear addresses of the shared data, and a second linear address range of guest linear addresses of the second private data is different than the third linear address range of guest linear addresses of the shared data.

11. The method of claim 10, comprising switching, by executing a VMFUNC instruction, from the first EPT for the first compartment to the second EPT for the second compartment.

12. The method of claim 7, comprising wherein the first EPT, the second EPT, and the third EPT are included in the VMM of the computing system.

13. The method of claim 12, comprising switching, by the VMM, from the second EPT for the second compartment to the first EPT for the first compartment.

14. At least one non-transitory machine-readable storage medium comprising instructions which, when executed by at least one processor, cause the at least one processor to:
select a first key identifier (ID) for a first compartment of a compartmentalized process of a computing system, the first compartment including first private data;
select a second key ID for a second compartment of the compartmentalized process of the computing system, the second compartment including second private data;
assign a first extended page table (EPT) having at least one memory address including the first key ID to the first compartment;
assign a second EPT having at least one memory address including the second key ID to the second compartment;
encrypt the first private data with a first key associated with the first key ID;
store the encrypted first private data in a memory starting at the at least one memory address of the first EPT; and
switch, by a virtual machine manager (VMM), from the first EPT for the first compartment to the second EPT for the second compartment.

15. The at least one machine-readable storage medium of claim 14, comprising instructions which, when executed by at least one processor, cause the at least one processor to:
retrieve the encrypted first private data from the memory by the first compartment using the first EPT; and
decrypt the encrypted first private data with the first key.

16. The at least one machine-readable storage medium of claim 14, comprising instructions which, when executed by at least one processor, cause the at least one processor to:
encrypt the second private data with a second key associated with the second key ID; and
store the encrypted second private data in the memory starting at the at least one memory address of the second EPT.

17. The at least one machine-readable storage medium of claim 16, comprising instructions which, when executed by at least one processor, cause the at least one processor to:
retrieve the encrypted second private data from the memory by the first compartment using the first EPT;
attempt to successfully decrypt the encrypted second private data with the first key; and
fail to successfully decrypt the encrypted second private data with the first key.

18. The at least one machine-readable storage medium of claim 16, comprising instructions which, when executed by at least one processor, cause the at least one processor to:
retrieve the encrypted first private data from the memory by the second compartment using the second EPT;
attempt to successfully decrypt the encrypted first private data with the second key; and
fail to successfully decrypt the encrypted first private data with the second key.

19. The at least one machine-readable storage medium of claim 16, comprising instructions which, when executed by at least one processor, cause the at least one processor to:

retrieve the encrypted second private data from the memory by the second compartment using the second EPT; and successfully decrypt the encrypted second private data with the second key.

20. An apparatus comprising:

a memory to store private data; and a processor to:

select a first key identifier (ID) for a first compartment of a compartmentalized process of the processor, the first compartment including first private data;

select a second key ID for a second compartment of the compartmentalized process of the processor, the second compartment including second private data;

assign a first extended page table (EPT) having at least one memory address including the first key ID to the first compartment;

assign a second EPT having at least one memory address including the second key ID to the second compartment;

encrypt the first private data with a first key associated with the first key ID;

store the encrypted first private data in the memory starting at the at least one memory address of the first EPT; and switch, by a virtual machine manager (VMM), from the first EPT for the first compartment to the second EPT for the second compartment.

21. The apparatus of claim 20, comprising the processor to:

retrieve the encrypted first private data from the memory by the first compartment using the first EPT; and decrypt the encrypted first private data with the first key.

22. The apparatus of claim 20, comprising the processor to:

encrypt the second private data with a second key associated with the second key ID; and store the encrypted second private data in the memory starting at the at least one memory address of the second EPT.

23. The apparatus of claim 22, comprising the processor to:

retrieve the encrypted second private data from the memory by the first compartment using the first EPT;

attempt to successfully decrypt the encrypted second private data with the first key; and fail to successfully decrypt the encrypted second private data with the first key.

24. The apparatus of claim 22, comprising the processor to:

retrieve the encrypted first private data from the memory by the second compartment using the second EPT;

attempt to successfully decrypt the encrypted first private data with the second key; and fail to successfully decrypt the encrypted first private data with the second key.

25. The apparatus of claim 22, comprising the processor to:

retrieve the encrypted second private data from the memory by the second compartment using the second EPT; and successfully decrypt the encrypted second private data with the second key.

* * * * *